(12) United States Patent
Yoshida et al.

(10) Patent No.: US 11,788,958 B2
(45) Date of Patent: Oct. 17, 2023

(54) OPTICAL SYSTEM, IMAGING APPARATUS INCLUDING OPTICAL SYSTEM, AND IMAGING SYSTEM

(71) Applicant: CANON KABUSHIKI KAISHA, Tokyo (JP)

(72) Inventors: Hiroki Yoshida, Tochigi (JP); Kazumi Kimura, Saitama (JP); Genichiro Kudo, Tochigi (JP); Hiroto Kano, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 17/529,103

(22) Filed: Nov. 17, 2021

(65) Prior Publication Data

US 2022/0074855 A1 Mar. 10, 2022

Related U.S. Application Data

(63) Continuation of application No. PCT/JP2020/019605, filed on May 18, 2020.

(30) Foreign Application Priority Data

May 24, 2019 (JP) ................. 2019-098009

(51) Int. Cl.
*G02B 5/18* (2006.01)
*G02B 13/08* (2006.01)
*G01N 21/47* (2006.01)
*G01J 3/28* (2006.01)

(52) U.S. Cl.
CPC ........ *G01N 21/4788* (2013.01); *G01J 3/2823* (2013.01); *G02B 5/18* (2013.01); *G02B 13/08* (2013.01)

(58) Field of Classification Search
CPC .... G01J 3/2823; G02B 13/08; G01N 21/4788
See application file for complete search history.

(56) References Cited

U.S. PATENT DOCUMENTS

| | | | |
|---|---|---|---|
| 6,046,808 A | 4/2000 | Fateley | |
| 6,744,505 B1* | 6/2004 | Wang | G01J 3/02 356/326 |
| 7,199,877 B2 | 4/2007 | Kehoe | |

(Continued)

FOREIGN PATENT DOCUMENTS

EP 3 812 821 A1 4/2021

*Primary Examiner* — Maurice C Smith
(74) *Attorney, Agent, or Firm* — CANON U.S.A., INC. IP Division

(57) ABSTRACT

An optical system 10 includes a front group 11, a light shielding member 4, and a rear group 12 disposed in order from a side of an object to a side of an image. The light shielding member 4 has an opening. The rear group 12 has a diffraction surface 5 and an aspherical surface 6. The aspherical surface 6 in a first section has a non-circular-arc shape. The grating spacing of the diffraction surface 5 in the first section changes from a center portion toward a peripheral portion to include an extremum value at the center portion. In the first section, the shape of at least one of a base surface of the diffraction surface 5 and an optical surface disposed closer than the diffraction surface 5 to the side of the object is asymmetric with respect to a normal line at a vertex thereof.

20 Claims, 16 Drawing Sheets

(56) References Cited

U.S. PATENT DOCUMENTS

| | | | |
|---|---|---|---|
| 10,724,899 B2* | 7/2020 | Hidaka | ............... G01J 3/42 |
| 10,794,764 B2* | 10/2020 | Zhang | ............. G01J 3/0208 |
| 2006/0077385 A1 | 4/2006 | Wang | |
| 2006/0082772 A1 | 4/2006 | Kehoe | |
| 2018/0066987 A1 | 3/2018 | Swanson | |

* cited by examiner

OPTICAL SYSTEM, IMAGING APPARATUS INCLUDING OPTICAL SYSTEM, AND IMAGING SYSTEM

CROSS-REFERENCE TO RELATED APPLICATIONS

This application is a Continuation of International Patent Application No. PCT/JP2020/019605, filed May 18, 2020, which claims the benefit of Japanese Patent Application No. 2019-098009, filed May 24, 2019, both of which are hereby incorporated by reference herein in their entirety.

TECHNICAL FIELD

The present invention relates to an optical system to be used in an imaging apparatus that acquires image information by dispersing a light flux from an object, and is suitable for inspection and evaluation in, for example, industrial fields including manufacturing industry, agricultural industry, medical industry, and the like.

BACKGROUND ART

PTL 1 discloses an optical system including a diffraction grating that disperses a light flux from a subject (object) into a plurality of light fluxes of mutually different wavelengths, and a lens that converges the light fluxes on a light reception surface of an imaging element.

CITATION LIST

Patent Literature

PTL 1: U.S. Pat. No. 7,199,877

SUMMARY OF INVENTION

In the optical system described in PTL 1, however, an aberration that differs for each wavelength is generated since incidence angles of light fluxes with respect to the lens differ from each other. In a method, the number of lenses may be increased to correct aberrations. In that case, the size of the total system of the optical system is increased.

The present invention provides an optical system capable of favorably correcting an aberration that differs for each wavelength while having a small size, an imaging apparatus including the optical system, and an imaging system.

In order to achieve the above, an optical system as one aspect of the present invention includes a front group, a light shielding member, and a rear group that are disposed in order from a side of an object to a side of an image. The light shielding member has an opening elongated in a first direction. The rear group has a diffraction surface that disperses a light flux that has passed through the opening into a plurality of light fluxes of mutually different wavelengths in a first section perpendicular to the first direction, and an aspherical surface disposed closer than the diffraction surface to the side of the image. The aspherical surface in the first section has a non-circular-arc shape. The grating spacing of the diffraction surface in the first section changes from a center portion toward a peripheral portion to include an extremum value at the center portion. In the first section, at least one of a base surface of the diffraction surface and an optical surface disposed closer than the diffraction surface to the side of the object has a shape asymmetric with respect to a normal line at a vertex thereof.

Further features of the present invention will become apparent from the following description of exemplary embodiments with reference to the attached drawings.

DESCRIPTION OF EMBODIMENTS

Hereinafter, a preferable embodiment of the present invention will be described with reference to the drawings. Some of the drawings are drawn in scales that differ from actual scales for convenience. In each of the drawings, the same members are given the same reference numbers, and duplicated description thereof is omitted.

In the following description, an XYZ coordinate system is defined as an absolute coordinate system, and an xyz coordinate system is defined as a local coordinate system for each optical surface. In the local coordinate system, the x-axis is an axis (an axis parallel to a normal line) at a vertex (origin) of each optical surface in a normal direction, the y-axis is an axis parallel to the Y-axis and orthogonal to the x-axis at the origin, and the z-axis is an axis orthogonal to the x-axis and the y-axis. Each of the Y-direction and the y-direction is also referred to as a first direction (reading direction), each of the Z-direction and the z-direction is also referred to as a second direction (spectral direction), each of the ZX section and the zx section is also referred to as a first section (spectral section), and each of the XY section and the xy section is also referred to as a second section (reading section).

Figure 1:
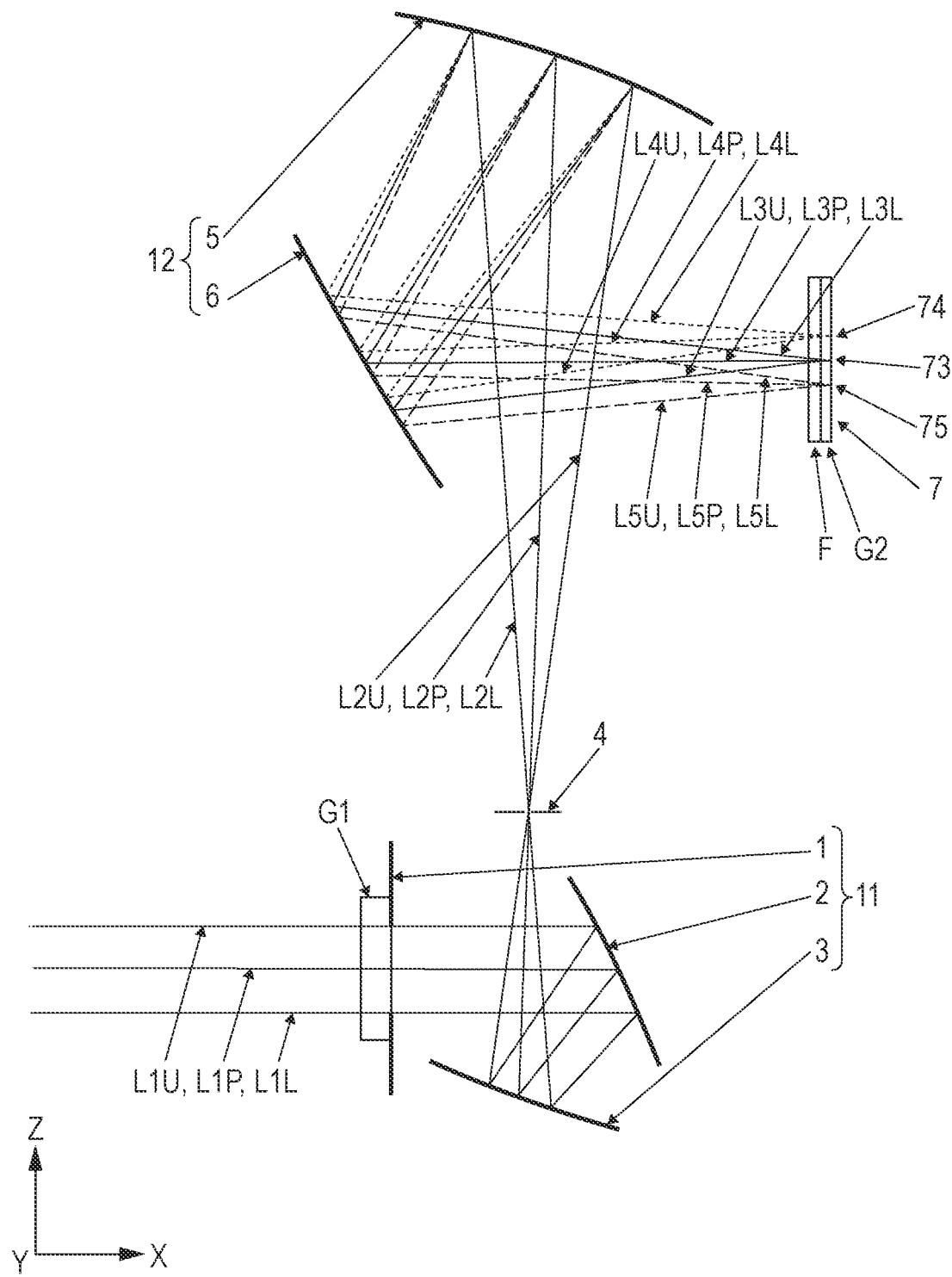
FIG. 1 is a schematic view of a principal portion in the ZX section of an optical system according to an embodiment.
Figure 2:
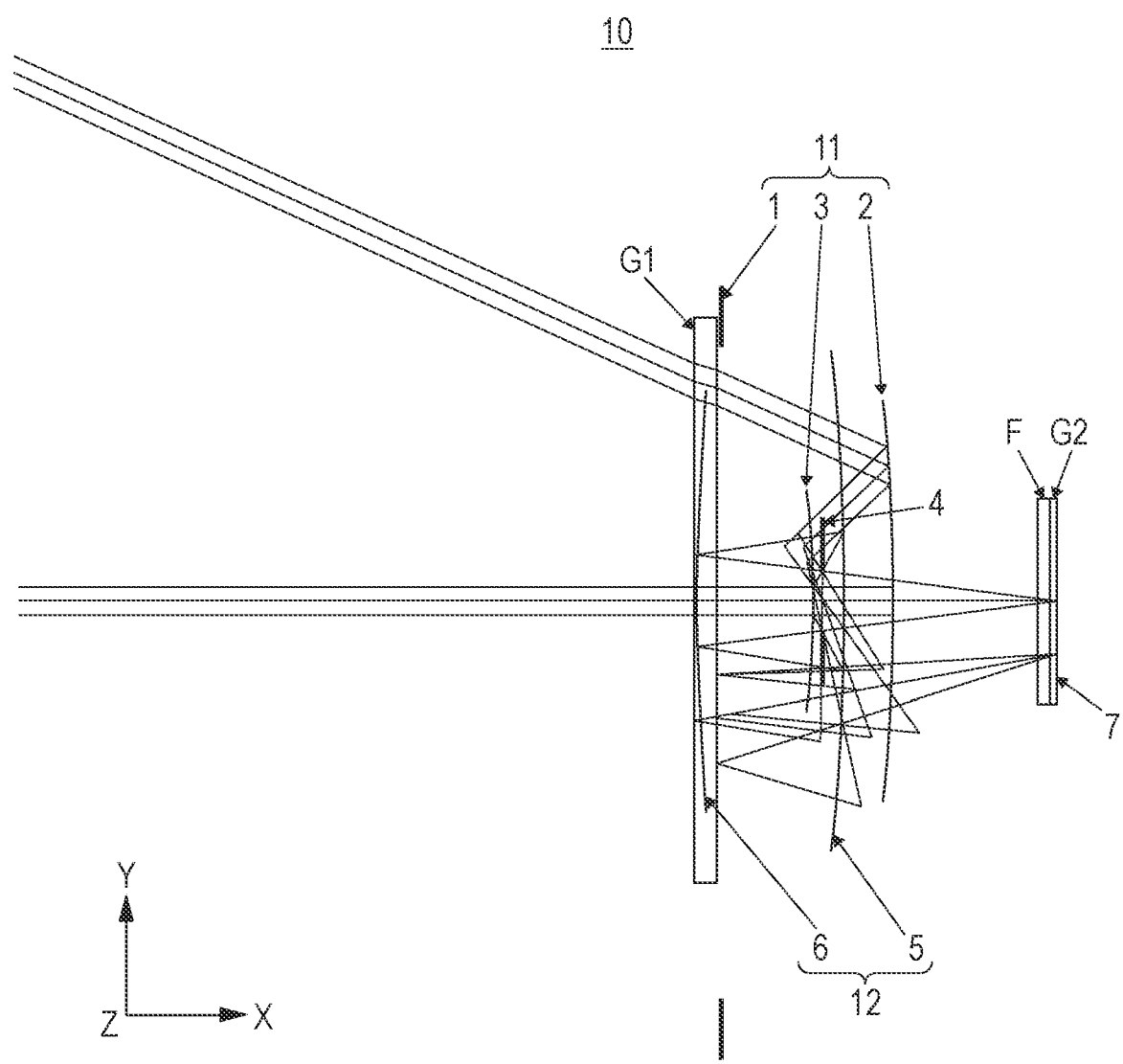
FIG. 2 is a schematic view of a principal portion in the XY section of an optical system according to an embodiment.

FIG. 1 and FIG. 2 are each a schematic view of a principal portion of an optical system 10 according to an embodiment of the present invention. FIG. 1 illustrates the first section, and FIG. 2 illustrates the second section. In each of FIG. 1 and FIG. 2, shapes in a section that includes an optical axis of each member are illustrated. In FIG. 2, members are illustrated in the same sheet for convenience. The optical axis mentioned here denotes an axis on an optical path of a principal ray (an axial principal ray) that passes through the center of an opening of a diaphragm 1, which will be described later.

In each of FIG. 1 and FIG. 2, a diffraction grating at a diffraction surface is omitted for convenience. In the present embodiment, a subject is disposed at a position in the vicinity of Z=0 at an object surface parallel to the YZ plane, and a light reception surface 7 of an imaging element is disposed at an image surface of the optical system 10. The subject is illuminated with white light (light having a plurality of wavelength components) such as sunlight.

The optical system 10 according to the present embodiment is constituted by a front group 11, a light shielding member (slit member) 4, and a rear group 12 that are disposed in order from the side of an object to the side of an image. The optical system 10 converges light fluxes from the subject (not illustrated) positioned on the −X side and thereby forms an image of the subject on the light reception surface (image surface) 7. The front group 11 includes the diaphragm 1, a first reflection surface 2, and a second reflection surface 3. The rear group 12 includes a third reflection surface (diffraction surface) 5 and a fourth reflection surface 6.

A dustproof glass G1 is disposed at the immediate front of the diaphragm 1, and an optical filter F and a cover glass G2 are disposed at the immediate front of the light reception surface 7. These are considered not to contribute to image formation. The dustproof glass G1 and the cover glass G2 can be any translucent members capable of protecting the optical system 10 and the light reception surface 7 and may be constituted by a material other than glass. As the optical filter F, for example, a filter that cuts unnecessary light such as second-order diffracted light can be employed.

The diaphragm 1 is a member for regulating the width of a light flux from the subject in the second direction and is disposed such that an opening surface thereof is perpendicular to the X-direction. The diaphragm 1 may be provided outside the optical system 10. As illustrated in FIG. 1 and FIG. 2, it is desirable that an incident port (the diaphragm 1) and an exit port (the light reception surface 7) for a light flux in the optical system 10 be disposed on mutually opposite sides with optical surfaces interposed therebetween. Consequently, when the optical system 10 is applied to an imaging apparatus, it is possible to easily avoid that a light flux from the subject is blocked by an imaging element, a wire, or the like.

The light shielding member 4 is provided with an opening (slit) elongated in the first direction. The light shielding member 4 functions as a diaphragm that regulates the width of a light flux in the first direction while shielding unnecessary light by limiting the angle of view in the first section of the optical system 10. The width of the opening of the light shielding member 4 is determined in accordance with a required light amount, resolution, and the like. The width of the opening of the light shielding member 4 in the second direction is shorter than the width (several micrometers) thereof in the first direction and is desirably several micrometers to several hundred micrometers. If the width of the opening of the light shielding member 4 in the second direction is excessively large, the resolution at the light reception surface 7 is decreased while, if the width is excessively small, an effective light flux contributing to image formation is easily shielded. The width of the opening of the light shielding member 4 in the second direction is thus more preferably 10 µm or more and 0.2 mm or less.

A region other than the diaphragm 1 and the opening of the light shielding member 4 is a light shielding surface through which at least light in a use wavelength band (designed wavelength band) of the optical system 10 is not transmitted. As the diaphragm 1 and the light shielding member 4, a sheet metal with a hole, a glass plate having a surface on which chromium is deposited, and the like can be employed. By employing such a light shielding member 4, the optical system 10 can form an image of a liner reading region (subject region) elongated in the first direction.

Each of the first reflection surface 2, the second reflection surface 3, and the fourth reflection surface 6 is a reflection surface that is obtained by subjecting a base surface having a free-form surface shape to reflection coating. The base surface of each reflection surface is formed by processing (cutting, polishing, molding with a die, or the like) a block material constituted by glass, resin, metal, or the like. Desirably, reflection coating has spectral reflection characteristics capable of achieving a sufficient energy efficiency (light utilization efficiency) in the use wavelength band. When the base surfaces have sufficient reflectance in the use wavelength band, reflection coating may be omitted.

In the present embodiment, each of the first reflection surface 2, the second reflection surface 3, and the fourth reflection surface 6 is an aspherical surface and is, specifically, an anamorphic optical surface (anamorphic reflection surface) whose curvature (power) differs between a first section and a section. Consequently, an optical effect that differs between the first section and the second section can be generated. Each reflection surface of the front group 11 may not be an anamorphic optical surface. For example, each reflection surface may be a spherical surface, and an anamorphic refracting surface may be provided instead. It is, however, desirable that at least one of the first reflection surface 2 and the second reflection surface 3 be an anamorphic optical surface to reduce the number of the optical surfaces in the front group 11.

It is sufficient for the rear group 12 to have at least one diffraction surface and at least one aspherical surface disposed closer than the diffraction surface to the image side. For example, different optical surfaces may be provided at the front and the rear of the diffraction surface 5, or a different aspherical surface may be provided with the fourth reflection surface 6 being a spherical surface. If the diffraction surface 5 is provided in the front group 11, only light fluxes of some wavelengths are allowed to pass through the opening of the light shielding member 4. It is thus necessary to provide the diffraction surface 5 in the rear group 12.

It is preferable in the optical system 10 that all of the optical surfaces of the front group 11 and the rear group 12 be anamorphic optical surfaces to suppress generation of an aberration by sharing power between the optical surfaces. The configurations of the front group 11 and the rear group 12 are not limited to those described above. The number of the optical surfaces in each group may be increased or decreased. It is, however, desirable that each of the front group 11 and the rear group 12 be constituted by two reflection surfaces, as in the present embodiment, to reduce the size of the total system and the number of components.

In the present embodiment, all of the optical surfaces are reflection surfaces to thereby suppress generation of a chromatic aberration while reducing the size of the optical system 10 by bending optical paths. Here, it is desirable that, as illustrated in FIG. 1, each reflection surface be disposed such that the optical paths intersect each other (form a shape of 4) in each of the front group 11 and the rear group 12 to reduce the size of the optical system 10. A prism or an inner-surface reflecting mirror may be used, as necessary, as a reflection member having a reflection surface. However, in order to suppress generation of a chromatic aberration as described above, the reflection member is desirably configured to be an outer-surface reflecting mirror and have a reflection surface adjacent to air. In addition, at least one optical surface may be a refracting surface (transmission surface), as necessary.

It is however difficult, in particular, in the rear group 12 to ensure a sufficient space for disposing a refractive optical element since holding members, wires, and the like (not illustrated) are disposed around the light shielding member 4 and the light reception surface 7. Even if a sufficient space can be ensured, it is required to dispose a plurality of refractive optical elements to favorably correct a chromatic aberration, resulting in an increase in the size of the total system. Therefore, it is desirable that at least all of the optical surfaces included in the rear group 12 be reflection surfaces. Further, it is more preferable that all of the optical surfaces included in the front group 11 be reflection surfaces.

The third reflection surface 5 is the diffraction surface 5 that is constituted by a base surface and a diffraction grating provided at the base surface. The base surface of the diffraction surface 5 has a free-formed surface shape, as with the other reflection surfaces. The diffraction grating is constituted by a plurality of gratings (protrusions) disposed at a pitch in the order of submicron to micron. The height of each grating is also in the order of submicron to micron. As the diffraction grating, a grating whose shape in the zx section is a step shape, a rectangular irregular shape, a blaze shape, a SIN wave shape, or the like can be employed. The shape of the diffraction grating is selected in consideration of required diffraction efficiency and ease of manufacture.

A blaze shape, which comparatively easily achieves both an improvement in diffraction efficiency and easy manufacture, is employed in the present embodiment. In the blaze-shaped diffraction grating, a part that is farthest from the base surface in the x-direction is referred to as a grating vertex, a part that reflects (diffracts) incident light is referred to as a blaze surface (grating surface), and a part that is adjacent to the blaze surface and that does not constitute to diffraction is referred to as a grating wall surface. The diffraction surface 5 according to the present embodiment is disposed with the blaze surface facing the side (image side) of the light reception surface 7 and the grating wall surface facing the object side. Consequently, a light flux of a short wavelength is incident on the +Z side of the light reception surface 7 in FIG. 1, and a light flux of a long wavelength is incident on the −Z side.

The base surface is formed by the same method as that for the other reflection surfaces described above. The diffraction grating can be formed by processing the base surface by cutting, polishing, or the like. However, the diffraction grating may be formed at the same time when the base surface is formed. For example, a fine irregular structure may be provided on a surface of a mirror surface piece constituting a metal mold, and a diffraction optical element provided with a diffraction grating may be manufactured by molding using the mold.

In order to improve the diffraction efficiency of the diffraction surface 5, reflection coating may be applied to the surface of the diffraction grating. The base surface of the diffraction surface 5 is desirably an anamorphic surface whose curvature differs between the xy section and the zx section. Consequently, power can be shared with the other anamorphic optical surfaces, which makes it easy to correct an aberration. In the present embodiment, the base surface of the diffraction surface 5 is an anamorphic surface but is not limited thereto when ease of manufacture of the diffraction grating is considered important.

With reference to FIG. 1 and FIG. 2, an effect of the optical system 10 will be described.

A light flux emitted from the subject passes through the opening of the diaphragm 1, is then reflected by the first reflection surface 2 and the second reflection surface 3, and reaches the light shielding member 4. Here, the front group 11 does not form an image of the subject over the opening of the light shielding member 4 in the second section (XY section) and forms an intermediate image of the subject over the opening of the light shielding member 4 in the first section (ZX section). That is, the front group 11 is configured such that a focal position does not coincide with the object surface in the XY section. Consequently, a liner intermediate image (line image) elongated in the first direction is formed over the opening of the light shielding member 4. Here, "over the opening" is not limited to the precise position of the opening and includes the vicinity (substantially over the opening) of the opening slightly away from the position of the opening in the optical axis direction.

The light flux that has passed through the opening of the light shielding member 4 is dispersed in the ZX section by the diffraction surface 5 into a plurality of light fluxes of mutually different wavelengths. Here, since the diffraction grating in the diffraction surface 5 is constituted by a plurality of gratings (ridge lines) arranged in the z-direction, the light flux incident on the diffraction surface 5 is subjected to a spectral effect only in the z-direction and does not subjected to the spectral effect in the y-direction.

Then, the plurality of light fluxes from the diffraction surface 5 are reflected by the fourth reflection surface 6 and incident on the light reception surface 7 disposed at the image surface. At this time, the plurality of light fluxes of mutually different wavelengths are converged at mutually different positions on the light reception surface 7 in the ZX section. That is, the optical system 10 according to the present embodiment is capable of forming a plurality of images for each of wavelengths on the light reception surface 7, and therefore, the light reception surface 7 can acquire a plurality of pieces of image information for each of the wavelengths.

As described above, the optical system 10 according to the present embodiment generates different optical effects in the XY section including the reading direction and the ZX section including the spectral direction. Specifically, in the XY section, an image of the subject is formed on the light reception surface 7 without being temporarily formed over the opening of the light shielding member 4. However, in the ZX section, an image of the subject is temporarily formed over the opening of the light shielding member 4 and then is reformed on the light reception surface 7. That is, an image of the subject is formed once in the XY section while an image of the subject is formed twice in the ZX section.

In this configuration, the convergence state of a light flux (a light flux incident on the opening) when the light flux passes through the opening of the light shielding member 4 is not limited in the XY section. It is thus possible to improve flexibility in the design of the optical system 10. Therefore, power can be appropriately shared between the front group 11 and the rear group 12, and an image of the subject can be formed on the light reception surface 7, which makes it easy to correct aberrations. It is thus possible to increase the angle of view (increase the reading region) and improve the definition of an imaged image.

Specifically, by configuring the front group 11 such that the focal position in the XY section does not coincide with the object surface, it is possible to cause a light flux to be non-parallel light when passing through the opening of the light shielding member 4. Consequently, the angle of view in the XY section is easily increased. If a light flux is parallel light when passing through the opening of the light shielding member 4, a large number of optical elements are required to be disposed in the rear group 12 to increase the angle of view of the optical system 10, resulting in an increase of the size of the total system. In the present embodiment, a light flux is caused to be divergent light when passing through the opening of the light shielding member 4 to increase the angle of view. However, the light flux may be caused to be convergent light, as necessary, when passing through the opening of the light shielding member 4.

Also in the XY section, when an image of the subject is temporarily formed over the opening of the light shielding member 4, each of the front group 11 and the rear group 12 is required to correct an aberration independently. Therefore, flexibility in the design of each optical surface is decreased, for example, power of each optical surface is required to be increased, which makes it difficult to increase the angle of view of the optical system 10. In the ZX section, since the angle of view is not required to be increased, it is possible to achieve a high NA by temporarily forming an image of the subject over the opening of the light shielding member 4.

In the above-described configuration, each of the front group 11 and the rear group 12 has power that differs between the XY section and the ZX section. Therefore, it is desirable that an anamorphic optical surface be provided in each of the front group 11 and the rear group 12 to achieve this configuration. Here, it is desirable that the anamorphic optical surface included in the front group 11 positively have power not only in the ZX section but also in the XY section (the absolute value of the curvature be larger than zero). It is more preferable that the sign of the power of the front group 11 and the sign of the power of the rear group 12 be different from each other.

Specifically, since an image of the subject is temporarily formed over the opening of the light shielding member 4 and then reformed on the light reception surface 7 in the ZX section, the front group 11 and the rear group 12 desirably have positive power. In the XY section, an image of the subject is not required to be temporarily formed over the opening of the light shielding member 4, and therefore, it is desirable that the front group 11 have negative power and the rear group 12 have positive power to further increase the angle of view. Consequently, the optical system 10 is of a retrofocus type in the XY section. Thus, the focal distance of the total system is decreased, and the angle of view is increased. When the subject is sufficiently away from the optical system 10, the front group 11 may have positive power and the rear group 12 may have negative power to cause the optical system 10 to be a telephoto optical system.

With reference to FIG. 1, a state in which a light flux is dispersed by the diffraction surface 5 will be described. Here, a case in which white light flux emitted from one point of the subject is dispersed into light fluxes of wavelengths of $\lambda 1$ [nm], $\lambda 2$ [nm], and $\lambda 3$ [nm] ($\lambda 2 < \lambda 1 < \lambda 3$) is considered. In FIG. 1, among the light fluxes, only a principal ray and marginal rays are illustrated.

A principal ray L1P and marginal rays L1U and L1L of the white light flux emitted from the subject form a linear intermediate image over the opening of the light shielding member 4 through the diaphragm 1, the first reflection surface 2, and the second reflection surface 3. A principal ray L2P and marginal rays L2U and L2L that have passed through the opening of the light shielding member 4 are dispersed by the diffraction surface 5 into rays L3P, L3U, and L3L of a wavelength $\lambda 1$, rays L4P, L4U, and L4L of a wavelength $\lambda 2$, and rays L5P, L5U, and L5L of a wavelength $\lambda 3$. Then, each of the rays of the wavelength $\lambda 1$, the wavelength $\lambda 2$, and the wavelength $\lambda 3$ is converged at a first position 73, a second position 74, and a third position 75 on the light reception surface 7 through the fourth reflection surface 6.

Here, a plurality of light fluxes of mutually different wavelengths from the diffraction surface 5 are incident at mutually different incidence angles with respect to an optical surface disposed closer than the diffraction surface 5 to the image side. Thus, an aberration that differs for each wavelength is generated. Such an aberration is remarkable, in particular, when it is designed such that diffraction angles at the diffraction surface 5 largely differ from each other in accordance with the wavelengths of light fluxes to improve the spectral resolution of the optical system 10, that is, to cause the light fluxes to be spaced apart from each other largely for each wavelength on the light reception surface 7.

Figure 3A:
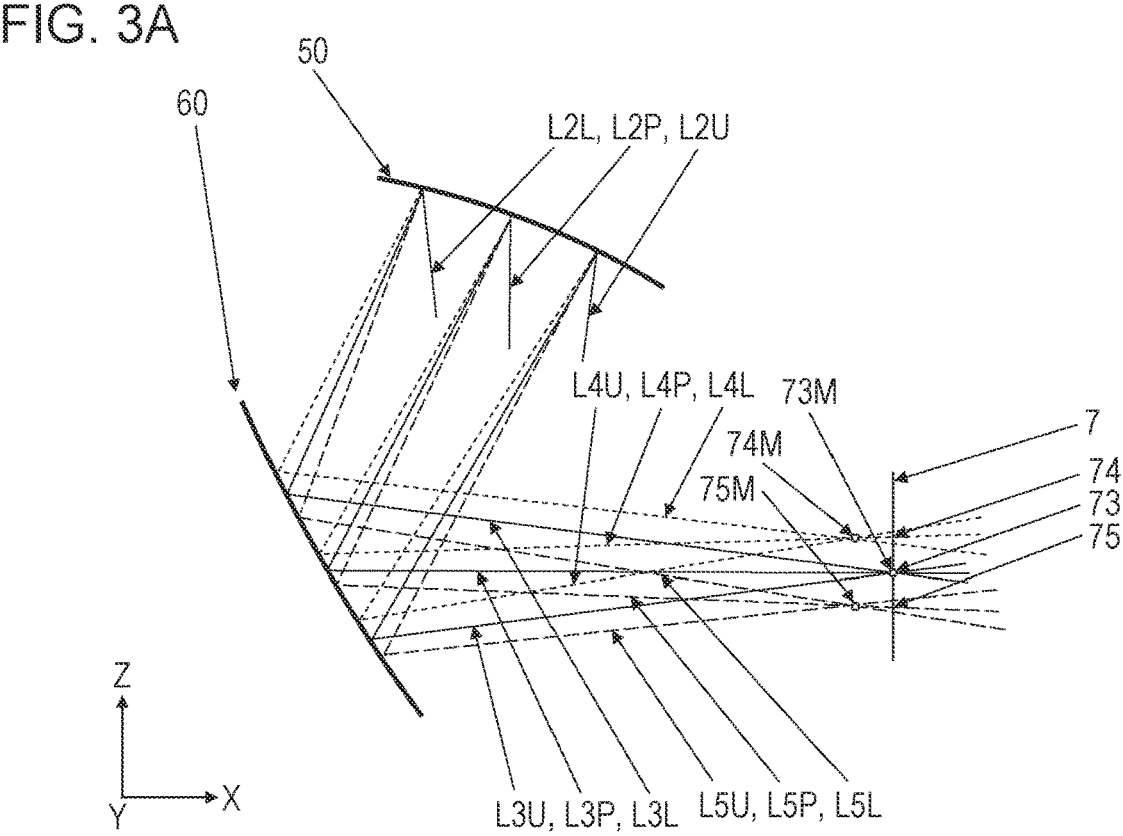
FIG. 3A is a view for describing generation of a field curvature in an optical system.

FIG. 3A illustrates a comparative embodiment in which a diffraction surface 50 is provided instead of the diffraction surface 5 in the optical system 10 according to the present embodiment and in which a reflection surface 60 is provided instead of the fourth reflection surface 6. As illustrated in FIG. 3A, light fluxes of respective wavelengths are converged at locations at an equal distance from the diffraction surface 50 as a base point. Thus, an aberration (field curvature) in which light convergence positions (light convergence points) of light fluxes of the respective wavelengths are shifted in the optical axis direction (X-direction) due to a difference in diffraction angle for each wavelength on the diffraction surface 50. Specifically, a light convergence position 73M of the light flux of the wavelength $\lambda 1$ coincides with the ideal light convergence position 73 while light convergence positions 74M and 75M of the light fluxes of the wavelengths $\lambda 2$ and $\lambda 3$ are shifted from the ideal light convergence positions 74 and 75 toward the object side (under side).

When such an aberration is generated, the width of a focal depth (common depth) in consideration of all of the wavelengths is narrowed, and a favorable image may not be obtained, for example, when the height of the subject in the optical axis direction largely changes in the first direction or when a manufacturing error is generated. In a method, an additional optical surface may be provided to correct an aberration. However, in this case, the size of the total system of the optical system is increased. Thus, in the present embodiment, the shape and the grating spacing of the diffraction surface 5 and the shape of the fourth reflection surface 6 are devised to favorably correct an aberration that differs for each wavelength while the size of the total system is reduced. This will be described in detail below.

First, as the first step, a means that corrects a shift of a light convergence position in the optical axis direction for each wavelength will be described.

Figure 3B:
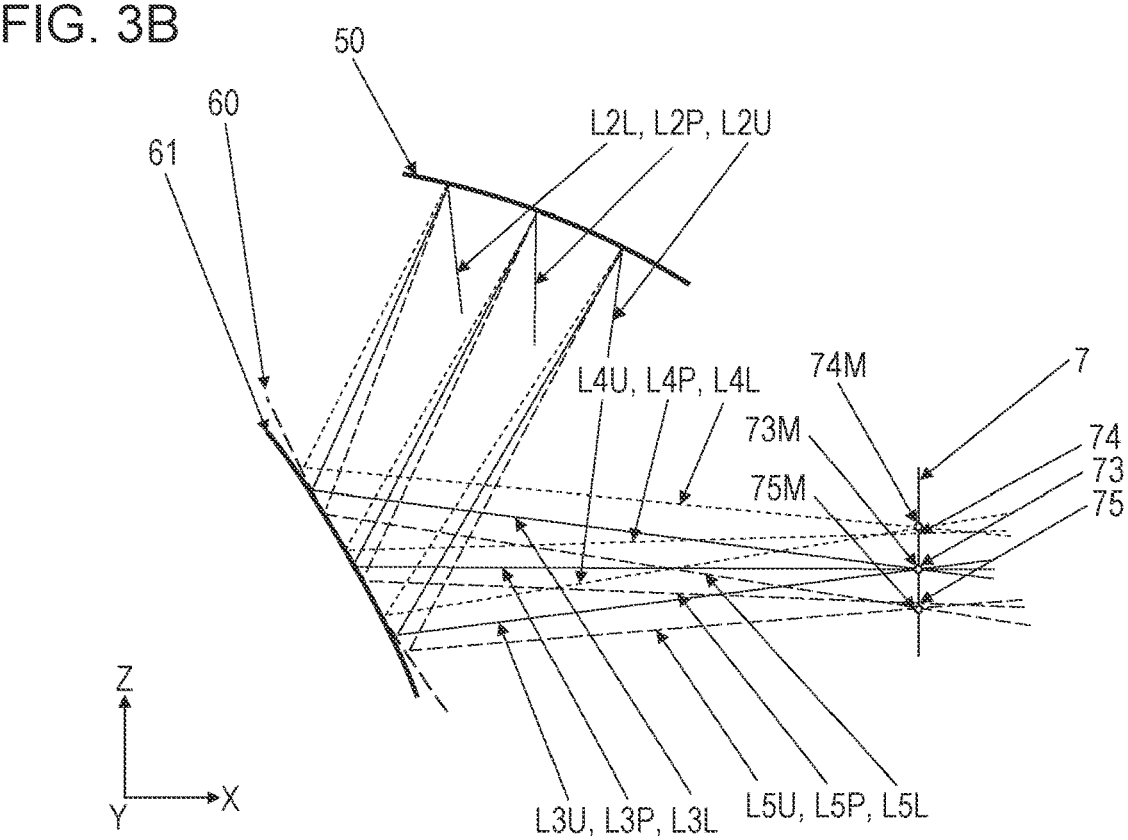
FIG. 3B is a view for describing correction of a field curvature in an optical system.

FIG. 3B illustrates a configuration in which the reflection surface 60 in FIG. 3A is replaced with a reflection surface 61 having the same shape as the shape of the fourth reflection surface 6 according to the present embodiment. The reflection surface 61 has a non-circular-arc shape in the ZX section. By thus providing an aspherical surface having a non-circular-arc shape in the ZX section closer than the diffraction surface 50 to the image side, it is possible to intentionally generate a spherical aberration and align the light convergence positions of light fluxes of respective wavelengths in the optical axis direction.

Light fluxes of all wavelengths are incident along exactly the same optical path with respect to optical surfaces disposed closer than the diffraction surface to the object side. Thus, even when these optical surfaces each have a non-circular-arc shape, it is not possible to generate a spherical aberration that differs for each wavelength. Therefore, to generate a spherical aberration that differs for each wavelength, an optical surface disposed closer than the diffraction surface 50 to the image side and in which incident positions of light fluxes of respective wavelengths differ from each other is required to have a non-circular-arc shape.

As illustrated in FIG. 3A, on the reflection surface 60, the marginal ray L4L of the wavelength $\lambda 2$ and the marginal ray L5U of the wavelength $\lambda 3$ are incident closer than the marginal rays L3L and L3U of the wavelength $\lambda 1$ to the peripheral side. To correct the light convergence positions 74M and 75M shifted toward the under side in FIG. 3A, it is required to generate a spherical aberration on the over side with respect to the light fluxes of the wavelength $\lambda 2$ and $\lambda 3$, compared with the light fluxes of the wavelength $\lambda 1$. Therefore, the shape of the reflection surface 61 in the ZX section is desirably a non-circular-arc shape having a protruding shape (having negative power) at the peripheral portion, compared with on the optical axis.

The shape of the reflection surface 61 in the ZX section is desirably a non-circular-arc (fourth-order or higher curve) indicated by a fourth-order or higher function. Here, an even-numbered order curve is preferable. With these configuration, it is possible to similarly correct the light convergence positions of the light fluxes of the wavelengths $\lambda 2$ and $\lambda 3$ while suppressing the variation of the light convergence position of the light flux of the wavelength $\lambda 1$. In FIG. 3B, the shape of the reflection surface 61 in the ZX section is a fourth-order curve but may be a sixth-order or higher curve, as necessary. It is, however, preferable to employ a fourth-order curve to correct the field curvature more favorably.

In the present embodiment, the fourth reflection surface 6 disposed closer than the diffraction surface 5 to the image side has a non-circular-arc shape. However, as necessary, an additional aspherical surface having a non-circular-arc shape may be provided closer than the diffraction surface 5 to the image side. Here, when a refracting element such as a lens is provided, a shape that is thicker (recessed) at the peripheral portion, compared with on the optical axis, is employed. It is, however, desirable that the fourth reflection surface 6 have a non-circular-arc shape with no other optical surfaces provided to further reduce the size of the total system.

Next, as the second step, a means that controls a coma aberration that differs for each wavelength will be described.

As illustrated in FIG. 3B, although a relative shift (field curvature on the light reception surface 7) of the light convergence positions 73M, 74M, and 75M in the optical axis direction can be corrected, a coma aberration that differs for each wavelength still remains. Specifically, the light convergence position 74M of the light flux of the wavelength $\lambda 2$ is shifted toward the +Z side with respect to the ideal light convergence position 74, and the light convergence position 75M of the light flux of the wavelength $\lambda 3$ is shifted toward the −Z side with respect to the ideal light convergence position 75. Meanwhile, the light convergence position 73M of the light flux of the wavelength $\lambda 1$ coincides with the ideal light convergence position 73. That is, a relationship of "the coma aberration amount of the wavelength $\lambda 2$">"the coma aberration amount (=0) of the wavelength $\lambda 1$">"the coma aberration amount of the wavelength $\lambda 3$" is satisfied.

Thus, in the present embodiment, the grating spacing (the distance between the grating vertexes of the diffraction grating) of the diffraction surface 5 in the ZX section changes from the center portion toward the peripheral portion (end portion) to include an extremum value (the minimum value or the maximum value) at the center portion. Here, the center portion refers to a region in a range within 10% of the width of the diffraction surface 5 with respect to a position on the diffraction surface 5 (a position on the optical axis) at which an axial principal ray is incident in the ZX section. Here, to suppress the variation of the light convergence position of the light flux of the wavelength $\lambda 1$, it is more preferable to change the grating spacing of the diffraction surface 5 so as to include an extremum value on the optical axis (surface center).

Figure 4A:
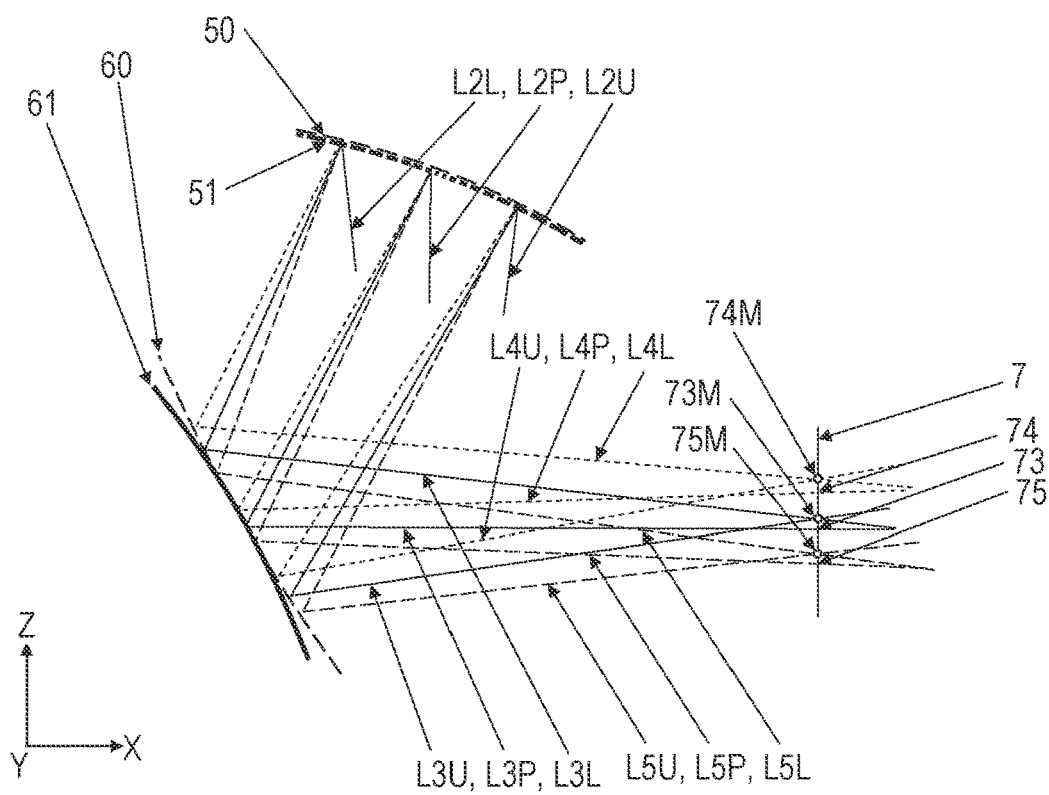
FIG. 4A is a view for describing generation of a coma aberration in an optical system.

FIG. 4A illustrates a configuration in which the diffraction surface 50 in FIG. 3B is replaced with a diffraction surface 51 whose grating spacing increases from the surface center toward the peripheral portion. That is, the grating spacing of the diffraction surface 51 is the smallest in the vicinity of the surface center and is the same as that of the diffraction surface 50 but is wider than that of the diffraction surface 50 at the peripheral portion. In general, a diffraction angle on a diffraction surface increases as the wavelength of an incident light flux increases and the grating spacing decreases. It is thus possible to reduce the diffraction angle at the peripheral portion to be smaller than that at the diffraction surface 50 by increasing the grating spacing of the peripheral portion compared with that at the center portion on the diffraction surface 51.

In FIG. 4A, compared with FIG. 3B, the traveling direction of the marginal rays L3U, L4U, L5U, L3L, L4L, and L5L from the peripheral portion of the diffraction surface 51 changes toward the shorter wavelength side, and the incident position of each marginal ray on the light reception surface 7 is moved toward the +Z side. Here, since the change in the diffraction angle is larger on the long wavelength side, a relationship of "the coma-aberration change amount of the wavelength $\lambda 2$"<"the coma-aberration change amount of the wavelength $\lambda 1$"<"the coma-aberration change amount of the wavelength $\lambda 3$" is satisfied. As described above, it is possible by changing the grating spacing of the diffraction surface 51 in the ZX section to generate a coma aberration of an amount that differs in accordance with a wavelength.

Specifically, when the coma aberration amount of the wavelength λ3 is changed from under to over (overcorrection), the coma aberration amount of the wavelength λ2 is also becomes over. At this time, the coma-aberration change amount of the wavelength λ3 is larger than the coma-aberration change amount of the wavelength λ2. It is thus possible to control the coma aberration amount of the wavelength λ2 and the coma aberration amount of the wavelength λ3 to be substantially the same. As illustrated in FIG. 4A, a coma aberration on the short wavelength side is also generated for the wavelength λ1 for which a coma aberration is originally zero. The coma aberration amount is, however, substantially the same as those for the wavelengths λ2 and λ3. Therefore, it is accordingly possible to cause the direction and the amount of a coma aberration that remains as a result to be substantially the same as those for all wavelengths.

Last, as the third step, a means that corrects a coma aberration similarly remaining for all wavelengths will be described.

Figure 4B:
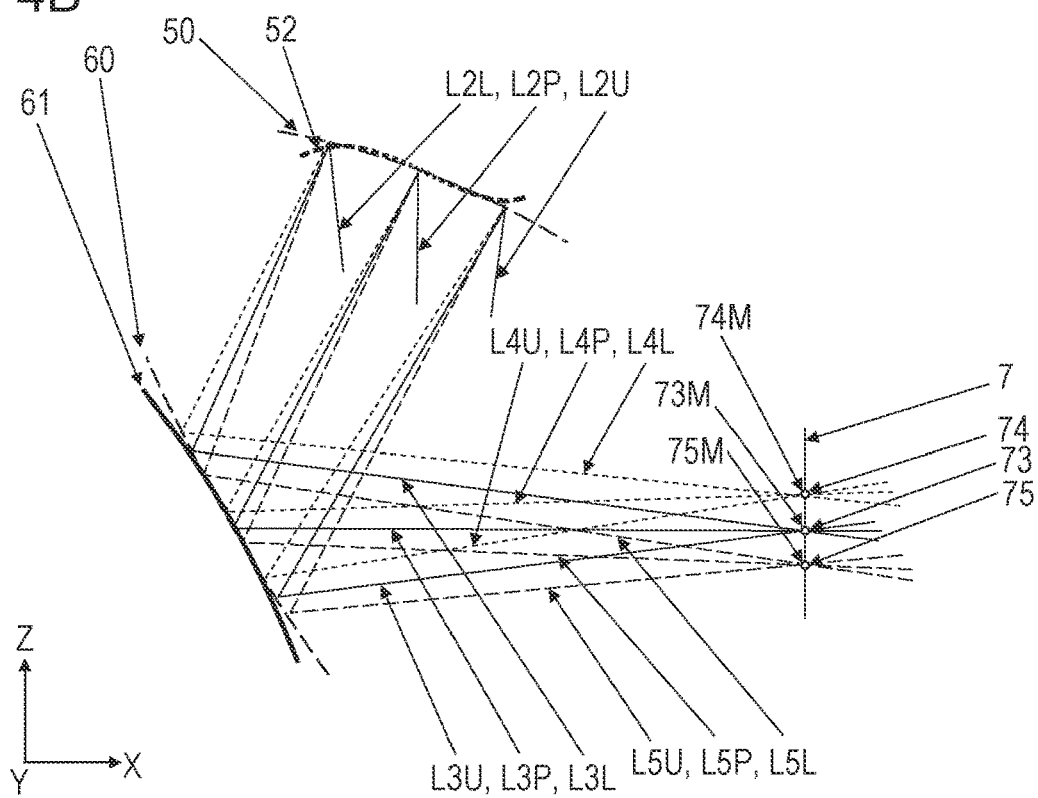
FIG. 4B is a view for describing correction of a coma aberration in an optical system.

FIG. 4B illustrates a configuration in which the diffraction surface 51 in FIG. 4A is replaced with a diffraction surface 52 having the same shape as that of the diffraction surface 5 according to the present embodiment. In FIG. 4A, the same coma aberration remains for all wavelengths. It is thus sufficient to generate a coma aberration that cancels the remaining coma aberration similarly for all wavelengths. Therefore, it is sufficient that the shape of an optical surface on which light fluxes of all wavelengths are incident along the same optical path is changed asymmetrically in the ZX section.

Thus, in FIG. 4B, the base surface of the diffraction surface 52 on which light fluxes of all wavelengths are incident along the same optical path has a shape asymmetric with respect to the normal line at the vertex (origin) thereof in the ZX section. Specifically, with respect to the normal line at the vertex of the base surface of the diffraction surface 52, the side where the marginal ray L2U is incident has a protruding shape having larger negative power, and the side where the marginal ray L2L is incident has a recessed shape having larger positive power.

Consequently, it is possible to change the traveling directions of the marginal rays L3U, L4U, and L5U to directions toward the principal rays L3P, L4P, and L5P and change the traveling directions of the marginal rays L3L, L4L, and L5L to directions away from the principal rays L3P, L4P, and L5P. As a result, a coma aberration on the long wavelength side is generated for all wavelengths. It is thus possible to cancel the remaining coma aberration on the short wavelength side in FIG. 4A.

The base surface of the diffraction surface 5 desirably has a shape that does not change as much as possible the traveling directions of the principal rays L3P, L4P, and L5P in the ZX section. The base surface of the diffraction surface 5 is thus desirably a non-circular-arc (third-order or higher curve) indicated by a third-order or higher function in the ZX section. The shape of the base surface of the diffraction surface 52 in the ZX section is a third-order curve in FIG. 4B but may be a fifth-order or higher curve, as necessary. It is, however, preferable to employ a third-order curve to favorably correct a coma aberration.

In the present embodiment, the base surface of the diffraction surface 5 has an asymmetric shape. However, any other optical surface may have an asymmetric shape as long as the optical surface is an optical surface on which light fluxes of all wavelengths are incident along the same optical path. That is, it is sufficient that, among the base surface of the diffraction surface 5 and the optical surfaces disposed closer than the diffraction surface 5 to the object side, at least one optical surface have an asymmetric shape. For example, the first reflection surface 2 or the second reflection surface 3 according to the present embodiment may have an asymmetric shape, or an additional optical surface having an asymmetric shape may be provided closer than the diffraction surface 5 to the object side.

However, when a large coma aberration is generated by an optical surface disposed closer than the light shielding member 4 to the object side, the light convergence state at the light shielding member 4 may change and affect the spectral performance. Therefore, it is desirable when a remaining coma aberration is large that an optical surface present closer than the light shielding member 4 to the image side have an asymmetric shape. It is more preferable in order to reduce the size of the total system that the base surface of the diffraction surface 5 have an asymmetric shape, as in the present embodiment. Alternatively, a plurality of optical surfaces closer than the light shielding member 4 to the object side may have asymmetric shapes to thereby share a coma aberration to be generated.

As described above, the optical system 10 according to the present embodiment is capable of both reducing the size of the total system and favorably correcting an aberration that differs for each wavelength.

Example 1

Hereinafter, the optical system 10 according to Example 1 of the present invention will be described. The optical system 10 according to the present example employs a configuration equivalent to that of the optical system 10 according to the above-described embodiment.

In the present example, the distance (object distance) from the subject to the diaphragm 1 is 450 mm, the width of the reading region in the first direction is 450 mm, and the angle of view in the XY section is ±24.17°. In the present example, the use wavelength band is 380 nm to 1120 nm, and the width of an image formation region (incident region) of a light flux on the light reception surface 7 in the second direction is 3.55 mm.

The composite focal distances of the front group 11 and the rear group 12 according to the present example in the XY section are −18.86 mm and 31.63 mm, respectively, and the composite focal distances of the front group 11 and the rear group 12 in the ZX section are 27.11 mm and 28.06 mm, respectively. Thus, the optical system 10 according to the present example improves image-formation performance by performing intermediate image formation in the ZX section and achieves an increase in the angle of view (increase in the reading region) in the XY section by employing a retrofocus type.

Here, an expression for a surface shape of each optical surface of the optical system 10 according to the present example will be described. The expression for the surface shape of each optical surface is not limited to that described below. Each optical surface may be designed by using any other expression, as necessary.

The shape (meridional shape) of the base surface of each of the first reflection surface 2, the second reflection surface 3, the third reflection surface (diffraction surface) 5, and the fourth reflection surface 6 according to the present example in the XY section is represented by the following expression in a respective local coordinate system.

$$x = \frac{y^2/R_y}{1+\sqrt{1-(1+K_y)(y/R_y)^2}} + B_2 y^2 + B_4 y^4 + B_6 y^6$$

Note that $R_y$ is a radius of curvature (radius of curvature in the meridional direction) in the xy section, and $K_y$, $B_2$, $B_4$, and $B_6$ are aspheric coefficients in the xy section. Regarding the aspheric coefficients $B_2$, $B_4$, and $B_6$, values may be different from each other, as necessary, on both sides (−y side and +y side) of the x-axis. Consequently, the meridional shape can be a shape asymmetric with respect to the x-axis in the y-direction. In the present example, second to sixth-order aspheric coefficients are used. However, higher-order aspheric coefficients may be used, as necessary.

The shape (sagittal shape) of the base surface of each of the optical surfaces according to the present example at a position in the y-direction in the ZX section is represented by the following expression.

$$s = \frac{z^2/r'}{1+\sqrt{1-(1+K_z)(z/r')^2}} * \sum\sum M_{jk} y^j z^k$$

Note that $K_z$ and $M_{jk}$ are aspheric coefficients in the zx section. In addition, r′ is a radius of curvature (radius of curvature in the sagittal direction) in the zx section at a position away from the optical axis by y in the y-direction and is represented by the following expression.

$$\frac{1}{r'} = \frac{1}{r} + E_2 y^2 + E_4 y^4$$

Note that r is a radius of curvature in the sagittal direction on the optical axis, and $E_2$ and $E_4$ are sagittal variation coefficients. When r=0 in the expression (Math. 3), the first term on the right side of the expression (Math. 2) is treated as zero. Regarding the sagittal variation coefficients $E_2$ and $E_4$, values may be different from each other, as necessary, on the −y side and the +y side. Consequently, the amount of the aspherical surface having a sagittal shape can be asymmetric in the y-direction. In addition, although the expression (Math. 3) includes only even-numbered terms, odd-numbered terms may be added, as necessary. Further, a higher-order sagittal variation coefficient may be used, as necessary.

The first order term of z in the expression (Math. 2) is a term that contributes to the tilt amount (sagittal tilt amount) of the optical surface in the zx section. Therefore, by setting different values for $M_{jk}$ on the −y side and the +y side, it is possible to change the sagittal tilt amount asymmetrically in the y-direction. However, an odd number term may be used to change the sagittal tilt amount asymmetrically. The second order term of z in the expression (Math. 2) is a term that contributes to the radius of curvature in the sagittal direction of an optical surface. Therefore, a radius of curvature in the sagittal direction may be given to the optical surface by using only the second order term of z in the expression (Math. 2), not expression (Math. 3), to simplify the design of each optical surface.

The shape of the diffraction grating in the diffraction surface 5 is not particularly limited as long as the shape is represented by a phase function based on a known diffraction optical theory. In the present example, when the basic wavelength (design wavelength) is λ [mm] and the phase coefficients in the zx section are C1, C2, and C3, the shape of the diffraction grating in the diffraction surface 5 is defined by the following phase function ϕ. Note that the diffraction order of the diffraction grating is considered to be 1 in the present embodiment.

$\phi = (2\pi/\lambda) \times (C1 \times z + C2 \times z^2 + C3 \times z^3)$

It shows that the grating spacing (grating pitch) of the diffraction grating is equal spacing when the phase coefficient C1 has a value, the grating spacing changes one-dimensionally when the phase coefficient C2 has a value, and the grating spacing changes two-dimensionally when the phase coefficient C3 has a value.

Note that the basic wavelength here is a wavelength for determining the height of the diffraction grating and is determined on the basis of spectral characteristics of illumination light with respect to the subject, spectral reflectance of the reflection surfaces other than the diffraction surface 5, spectral light sensitivity of the imaging element including the light reception surface 7, required diffraction efficiency, and the like. That is, the basic wavelength corresponds to a wavelength that is to be focused in detection by the light reception surface 7. In the present example, by setting a basic wavelength λ to 542 nm, it is possible to preferentially observe a visible region in the use wavelength band. However, for example, the basic wavelength may be set to about 850 nm to enable a near infrared region to be observed preferentially, or the basic wavelength may be set to about 700 nm to enable a visible region to a near infrared region to be observed in a balanced manner.

Table 1 indicates the position of the vertex of each optical surface of the optical system 10 according to the present example, the direction of the normal line at the vertex, and the radius of curvature in each section. In Table 1, the position of the vertex of each optical surface is indicated by distances X, Y, and Z [mm] from the origin in the absolute coordinate system, and the direction of the normal line (x-axis) is indicated by an angle θ [deg] with respect to the X-axis in the ZX section including the optical axis. In addition, d [mm] indicates an interval (surface interval) between the optical surfaces, d′ [mm] indicates an interval between reflection points of the principal ray on each optical surface, and $R_y$ and $R_z$ indicate radiuses of curvatures in the XY section and the ZX section, respectively, at the reflection points of the principal ray. When the value of the radius of curvature of each reflection surface is positive, the value represents a recessed surface, and when the value is negative, the value represents a protruding surface.

TABLE 1

| | | X | Y | Z | θ | d | d′ | $R_y$ | $R_z$ |
|---|---|---|---|---|---|---|---|---|---|
| Dustproof Glass | G1 | −2.000 | 0.000 | −1.700 | 0.00 | 2.000 | 2.000 | | |
| Diaphragm | 1 | 0.000 | 0.000 | −1.700 | 0.00 | 14.916 | 14.894 | | |
| First Reflection Surface | 2 | 14.915 | 0.000 | −1.801 | −154.38 | 10.635 | 10.639 | 183.6644 | 74.94018 |
| Second Reflection Surface | 3 | 8.225 | 0.000 | −10.068 | 69.71 | 18.743 | 18.760 | −27.6652 | 140.4991 |

TABLE 1-continued

|  |  | X | Y | Z | θ | d | d' | $R_y$ | $R_z$ |
|---|---|---|---|---|---|---|---|---|---|
| Light Shielding Member | 4 | 8.949 | 0.000 | 8.661 | 90.00 | 49.716 | 49.709 |  |  |
| Third Reflection Surface | 5 | 10.722 | 0.000 | 58.346 | −109.03 | 23.797 | 23.824 | 73.52644 | 58.40001 |
| Fourth Reflection Surface | 6 | −1.795 | 0.000 | 38.106 | 29.35 | 29.096 | 29.074 | 159.2054 | 264.9825 |
| Optical Filter | F | 27.300 | 0.000 | 38.280 | 0.00 | 1.000 | 1.000 |  |  |
| Cover Glass | G2 | 28.300 | 0.000 | 38.280 | 0.00 | 0.600 | 0.600 |  |  |
| Light Reception Surface | 7 | 28.900 | 0.000 | 38.280 | 0.00 |  |  |  |  |

Table 2 indicates surface shapes of the optical surfaces of the optical system 10 according to the present example. In table 2, "E±*" indicates "×10^{±*}".

TABLE 2

|  | First Reflection Surface | Second Reflection Surface | Third Reflection Surface | Fourth Reflection Surface |
|---|---|---|---|---|
| $R_y$ | 1.837E+02 | −2.767E+01 | 7.353E+01 | 1.593E+02 |
| $K_y$ | −1.000E+00 | −1.000E+00 | −1.000E+00 | −1.000E+00 |
| $B_2$ | 0.000E+00 | 0.000E+00 | 0.000E+00 | 0.000E+00 |
| $B_4$ | 1.811E−06 | −2.462E−05 | 3.491E−07 | −2.674E−07 |
| $B_6$ | −3.042E−10 | −2.443E−07 | 4.935E−11 | −1.447E−10 |
| r | 0.000E+00 | 0.000E+00 | 0.000E+00 | 0.000E+00 |
| $K_z$ | 0.000E+00 | 0.000E+00 | 0.000E+00 | 0.000E+00 |
| $E_2$ | 0.000E+00 | 0.000E+00 | 0.000E+00 | 0.000E+00 |
| $E_4$ | 0.000E+00 | 0.000E+00 | 0.000E+00 | 0.000E+00 |
| $M_{01}$ | 0.000E+00 | 0.000E+00 | 0.000E+00 | 0.000E+00 |
| $M_{21}$ | 3.135E−04 | 8.246E−04 | −1.376E−05 | −7.018E−05 |
| $M_{41}$ | −1.425E−07 | 7.616E−06 | −1.287E−08 | −2.104E−08 |
| $M_{02}$ | 6.672E−03 | 3.559E−03 | 8.562E−03 | 1.887E−03 |
| $M_{22}$ | 3.220E−05 | −1.155E−04 | 1.180E−06 | −6.675E−08 |
| $M_{42}$ | −5.390E−08 | −6.034E−07 | −8.701E−11 | 2.563E−09 |
| $M_{03}$ | 3.048E−05 | 0.000E+00 | −4.716E−07 | −2.744E−05 |
| $M_{23}$ | 2.042E−06 | 3.909E−06 | −1.177E−08 | 1.487E−08 |
| $M_{43}$ | −4.406E−09 | 5.686E−08 | −2.592E−11 | −1.500E−10 |
| $M_{04}$ | 6.278E−06 | −4.376E−05 | 1.207E−06 | −1.174E−06 |
| $M_{24}$ | 2.487E−08 | 1.429E−06 | 9.892E−10 | −8.799E−10 |
| $M_{44}$ | 0.000E+00 | 0.000E+00 | 0.000E+00 | 0.000E+00 |
| $M_{05}$ | 0.000E+00 | 0.000E+00 | 0.000E+00 | 0.000E+00 |
| $M_{25}$ | 0.000E+00 | 0.000E+00 | 0.000E+00 | 0.000E+00 |
| $M_{45}$ | 0.000E+00 | 0.000E+00 | 0.000E+00 | 0.000E+00 |
| $M_{06}$ | 0.000E+00 | 0.000E+00 | 0.000E+00 | 0.000E+00 |
| $M_{26}$ | 0.000E+00 | 0.000E+00 | 0.000E+00 | 0.000E+00 |
| $M_{46}$ | 0.000E+00 | 0.000E+00 | 0.000E+00 | 0.000E+00 |
| C1 |  |  | 5.299E−02 |  |
| C2 |  |  | 2.742E−06 |  |
| C3 |  |  | −6.707E−06 |  |
| λ |  |  | 0.542 |  |

Table 3 indicates diameters [mm] of the opening of the diaphragm 1, the opening of the light shielding member 4, and the light reception surface 7 in the y-direction and the z-direction. In the present example, each of the opening of the diaphragm 1, the opening of the light shielding member 4, and the light reception surface 7 has a rectangular shape.

TABLE 3

|  | Diaphragm | Light Shielding Member | Light Reception Surface |
|---|---|---|---|
| Diameter (y) | 41.6 | 5 | 9.22 |
| Diameter (z) | 5.6 | 0.05 | 5.76 |

Next, an optical system according to Comparative Example 1 will be considered to describe the optical performance of the present example. Regarding the optical system according to Comparative Example 1, values indicated in Table 1 and Table 3 are the same as those of Example 1, but values of the aspheric coefficient and the phase coefficient of the diffraction surface 5 and the fourth reflection surface 6 differ from those of Example 1. Similarly to Table 2, Table 4 indicates surface shapes of the optical surfaces of the optical system according to Comparative Example 1.

TABLE 4

|  | First Reflection Surface | Second Reflection Surface | Third Reflection Surface | Fourth Reflection Surface |
|---|---|---|---|---|
| $R_y$ | 1.837E+02 | −2.767E+01 | 7.354E+01 | 1.590E+02 |
| $K_y$ | −1.000E+00 | −1.000E+00 | −1.000E+00 | −1.000E+00 |
| $B_2$ | 0.000E+00 | 0.000E+00 | 0.000E+00 | 0.000E+00 |
| $B_4$ | 1.811E−06 | −2.462E−05 | 3.543E−07 | −2.848E−07 |
| $B_6$ | −3.042E−10 | −2.443E−07 | 4.459E−11 | −1.244E−10 |
| r | 0.000E+00 | 0.000E+00 | 0.000E+00 | 0.000E+00 |
| $K_z$ | 0.000E+00 | 0.000E+00 | 0.000E+00 | 0.000E+00 |
| $E_2$ | 0.000E+00 | 0.000E+00 | 0.000E+00 | 0.000E+00 |
| $E_4$ | 0.000E+00 | 0.000E+00 | 0.000E+00 | 0.000E+00 |
| $M_{01}$ | 0.000E+00 | 0.000E+00 | 0.000E+00 | 0.000E+00 |
| $M_{21}$ | 3.135E−04 | 8.246E−04 | −1.389E−05 | −7.049E−05 |
| $M_{41}$ | −1.425E−07 | 7.616E−06 | −1.268E−08 | −2.122E−08 |
| $M_{02}$ | 6.672E−03 | 3.559E−03 | 8.559E−03 | 1.887E−03 |
| $M_{22}$ | 3.220E−05 | −1.155E−04 | 1.157E−06 | −7.531E−08 |
| $M_{42}$ | −5.390E−08 | −6.034E−07 | −2.862E−11 | 2.433E−09 |
| $M_{03}$ | 3.048E−05 | 0.000E+00 | 4.863E−06 | −2.681E−05 |
| $M_{23}$ | 2.042E−06 | 3.909E−06 | −1.339E−08 | 9.101E−09 |
| $M_{43}$ | −4.406E−09 | 5.686E−08 | −3.432E−11 | 8.307E−11 |
| $M_{04}$ | 6.278E−06 | −4.376E−05 | 7.955E−07 | 4.177E−07 |
| $M_{24}$ | 2.487E−08 | 1.429E−06 | 1.279E−09 | 9.476E−10 |
| $M_{44}$ | 0.000E+00 | 0.000E+00 | 0.000E+00 | 0.000E+00 |
| $M_{05}$ | 0.000E+00 | 0.000E+00 | 0.000E+00 | 0.000E+00 |
| $M_{25}$ | 0.000E+00 | 0.000E+00 | 0.000E+00 | 0.000E+00 |
| $M_{45}$ | 0.000E+00 | 0.000E+00 | 0.000E+00 | 0.000E+00 |
| $M_{06}$ | 0.000E+00 | 0.000E+00 | 0.000E+00 | 0.000E+00 |
| $M_{26}$ | 0.000E+00 | 0.000E+00 | 0.000E+00 | 0.000E+00 |
| $M_{46}$ | 0.000E+00 | 0.000E+00 | 0.000E+00 | 0.000E+00 |
| C1 |  |  | 5.299E−02 |  |
| C2 |  |  | 0.000E+00 |  |
| C3 |  |  | 0.000E+00 |  |
| λ |  |  | 0.542 |  |

In the present example, as the above-described first step, the fourth reflection surface 6 in the ZX section has a non-circular-arc shape. Specifically, the value of a fourth-order aspheric coefficient $M_{04}$ of the fourth reflection surface 6 in the ZX section is $-1.174 \times 10^{-6}$ in contrast to $4.177 \times 10^{-7}$ in Comparative Example 1. Consequently, the fourth reflection surface 6 has a protruding shape at the peripheral portion, and a shift of the light convergence position in the optical axis direction for each wavelength is corrected.

Figure 5:
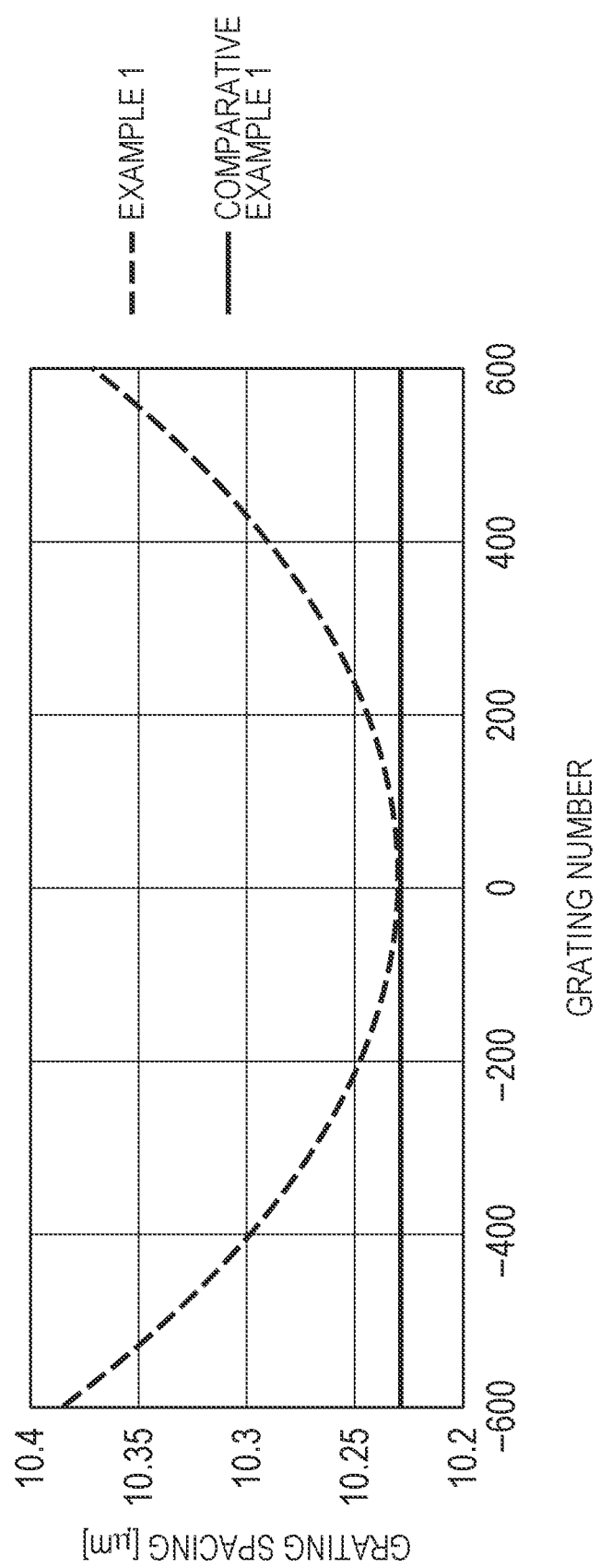
FIG. 5 is a view illustrating changes in grating spacing of diffraction surfaces according to Example 1 and a comparative example.

In the present example, as the above-described second step, the grating spacing of the diffraction surface 5 in the ZX section changes from the optical axis toward the peripheral portion to include an extremum value on the optical axis. FIG. 5 indicates states of changes in the grating spacing of the diffraction surface 5 in the present example and Comparative Example 1. In FIG. 5, a number (grating number) of a grating vertex on the optical axis is set to 0.

In the Comparative Example 1, the value of the third-order phase coefficient C3 in the phase function ϕ is 0, and the grating spacing of the diffraction surface 5 is constant regardless of the position. Thus, it is not possible to control coma aberrations of wavelengths to be substantially equal to each other. In contrast, in the present example, the value of the phase coefficient C3 is $-6.707\times10^{-6}$. Consequently, the grating spacing of the diffraction surface 5 increases by approximately 1.3% from 10.228 μm on the optical axis to 10.363 μm at the peripheral portion (z=6 mm), and it is possible to control coma aberrations of wavelengths to be substantially equal to each other.

In addition, in the present example, as the above-described third step, the shape of the base surface of the diffraction surface 5 in the ZX section is configured to be asymmetric with respect to the normal line at the vertex. Specifically, the value of a third-order aspheric coefficient $M_{03}$ of the diffraction surface 5 in the ZX section is $-4.716\times10^{-7}$ in contrast to $4.863\times10^{-6}$ in Comparative Example 1. Consequently, the side of the diffraction surface 5 close to the light reception surface 7 has a protruding shape having larger negative power, the side thereof far from the light reception surface 7 has a recessed shape having larger positive power, and the coma aberration of each wavelength is thereby favorably corrected.

When an aberration that differs for each wavelength is corrected in the first to third steps, the light convergence positions (best focus positions) of the light fluxes of wavelengths are evenly shifted toward the over side with respect to the light reception surface 7. These shifts are cancelled by adjusting the position of the light reception surface 7 in the optical axis direction. In the present example, however, the light reception surface 7 is purposely fixed, and the shape of the diffraction surface 5 is devised as a countermeasure for these shifts. Specifically, the value of a second-order aspheric coefficient $M_{02}$ of the diffraction surface 5 in the ZX section is $8.562E\times10^{-3}$ in contrast to $8.559E\times10^{-3}$ in Comparative Example 1. Consequently, the shape of the diffraction surface 5 in the ZX section is curved as a whole, the light convergence position of each light flux is moved toward the under side, and shifts with respect to the light reception surface 7 are corrected.

Figure 6:
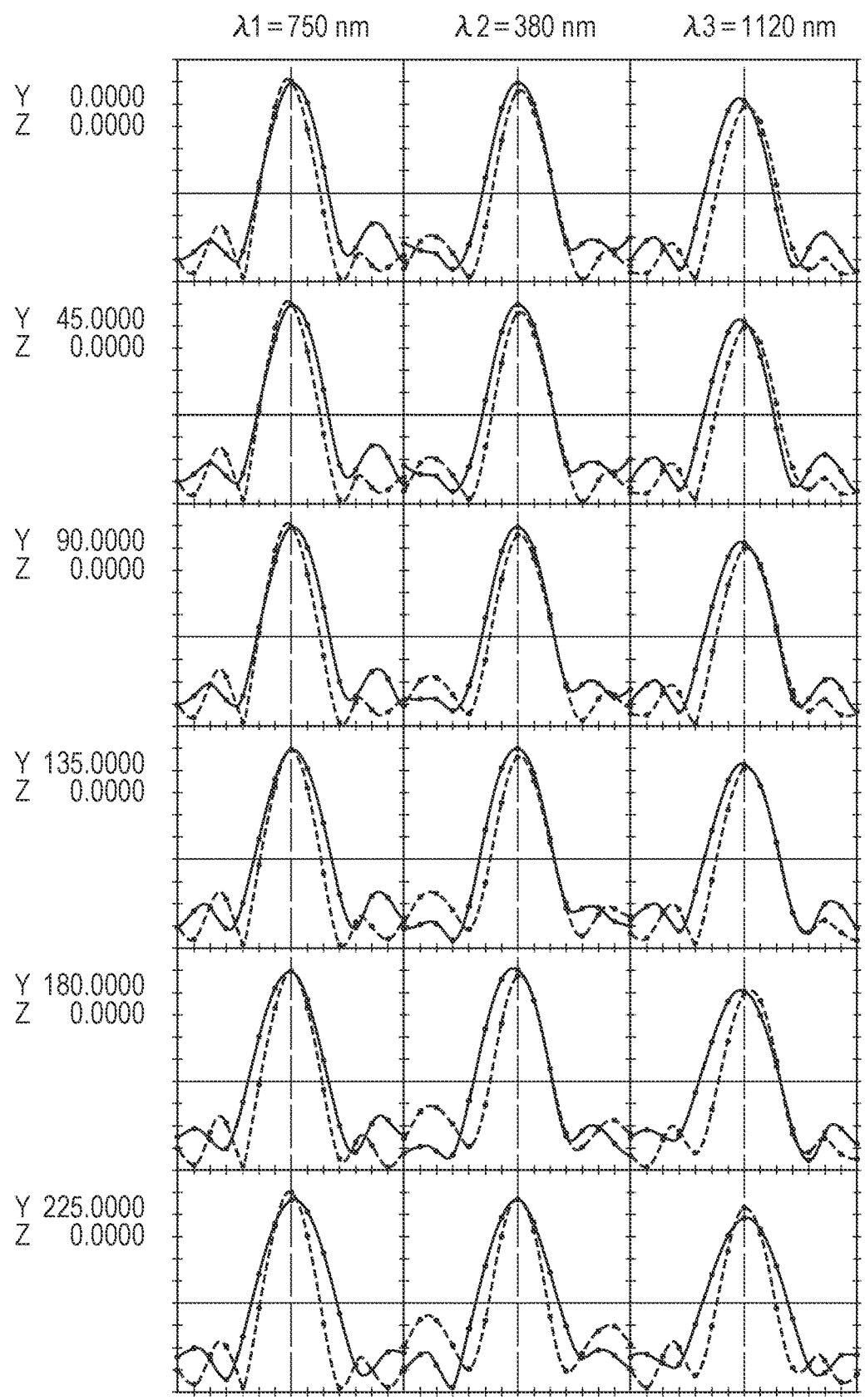
FIG. 6 is a view illustrating a MTF of an optical system according to Example 1.

FIG. 6 illustrates a MTF (Modulated Transfer Function) of the optical system 10 according to the present example. FIG. 6 illustrates the MTF for each of wavelengths λ1=750 nm, λ2=380 nm, and λ3=1120 nm in each of cases in which the object height [mm] in the reading region is Y=0, 45, 90, 135, 180, and 225. The spatial frequency [number/mm] of the imaging element including the light reception surface 7 is 27.8/mm.

Figure 7A:
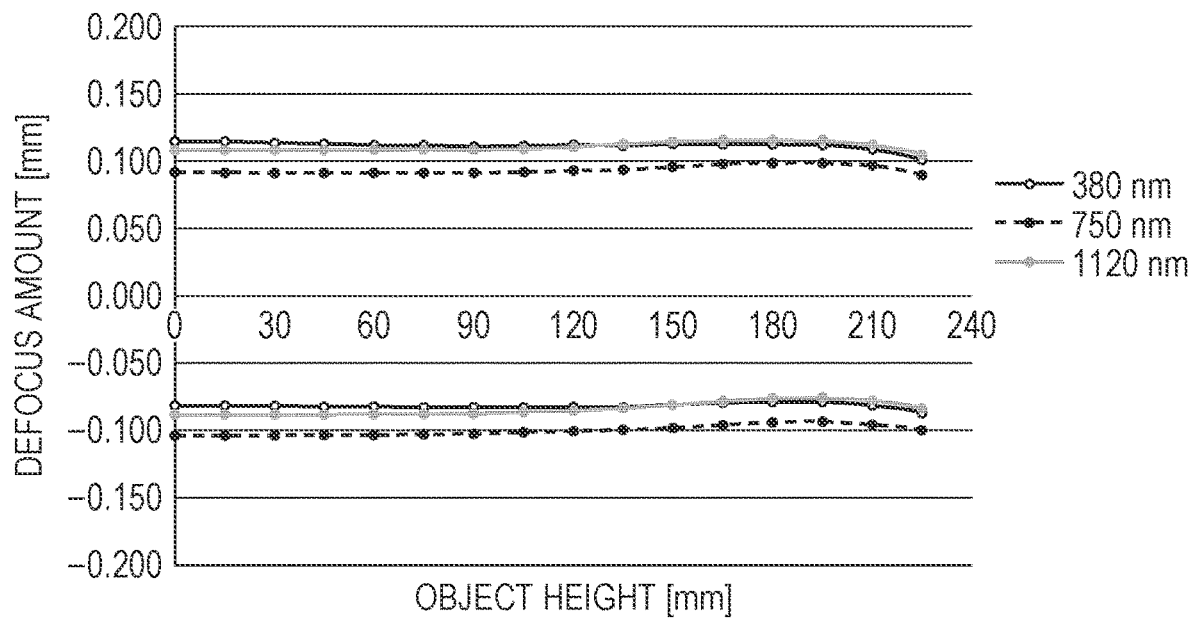
FIG. 7A is a view illustrating a depth curve in the XY section of an optical system according to Example 1.
Figure 7B:
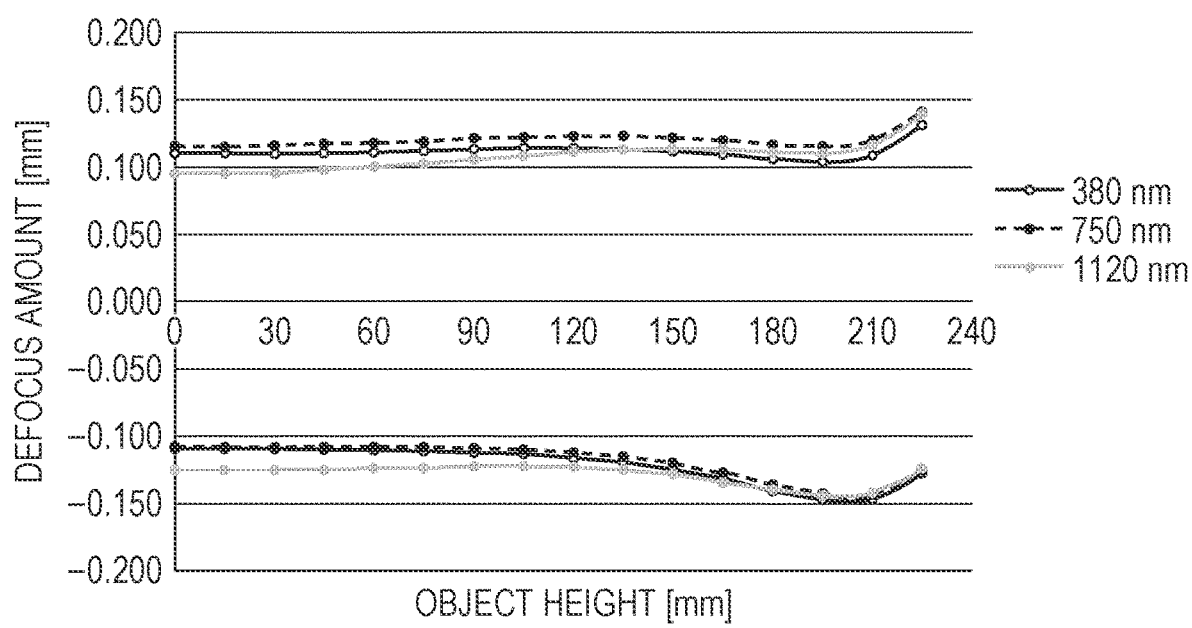
FIG. 7B is a view illustrating a depth curve in the ZX section of an optical system according to Example 1.
Figure 8:
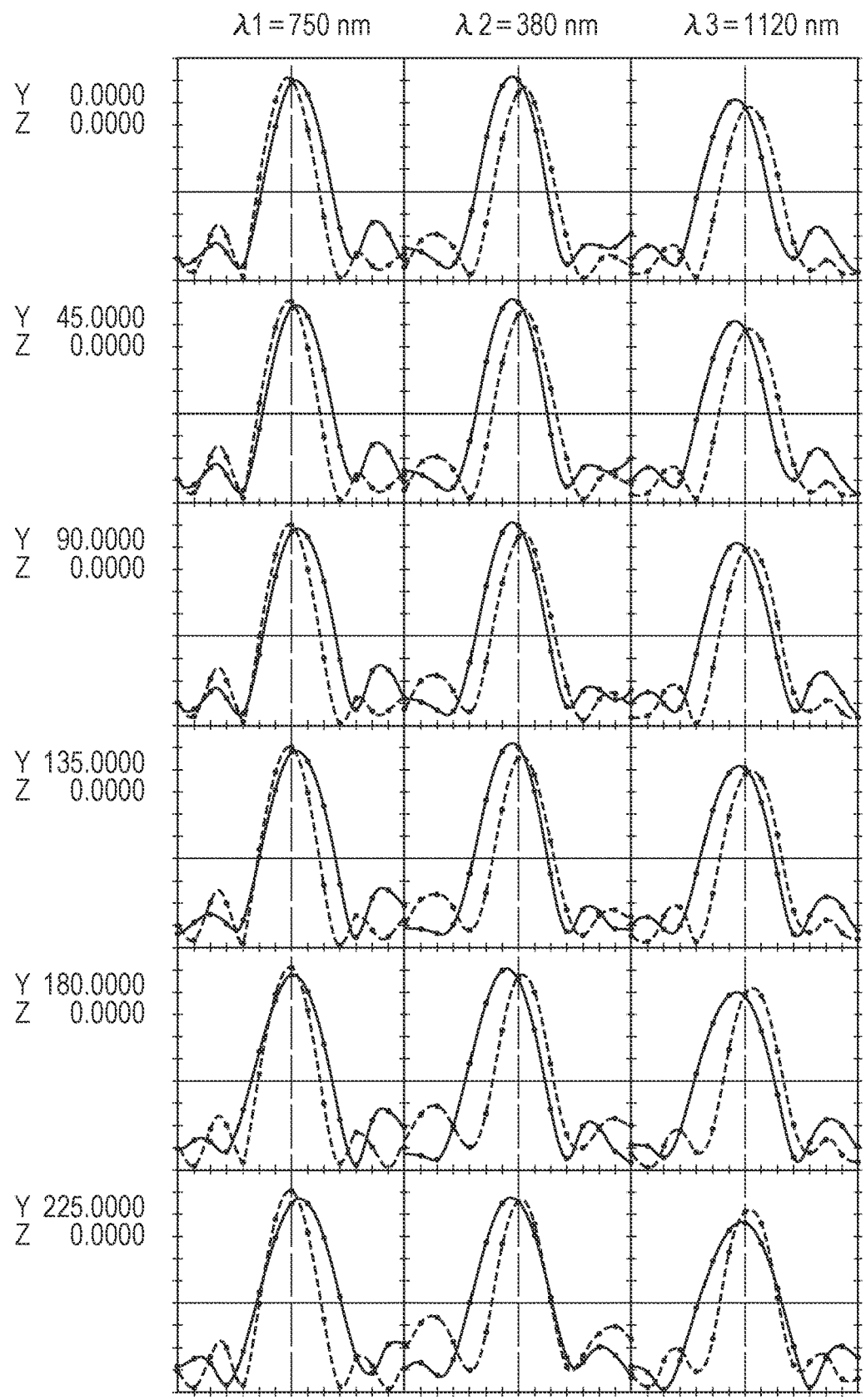
FIG. 8 is a view illustrating a MTF of an optical system according to Comparative Example 1.
Figure 9A:
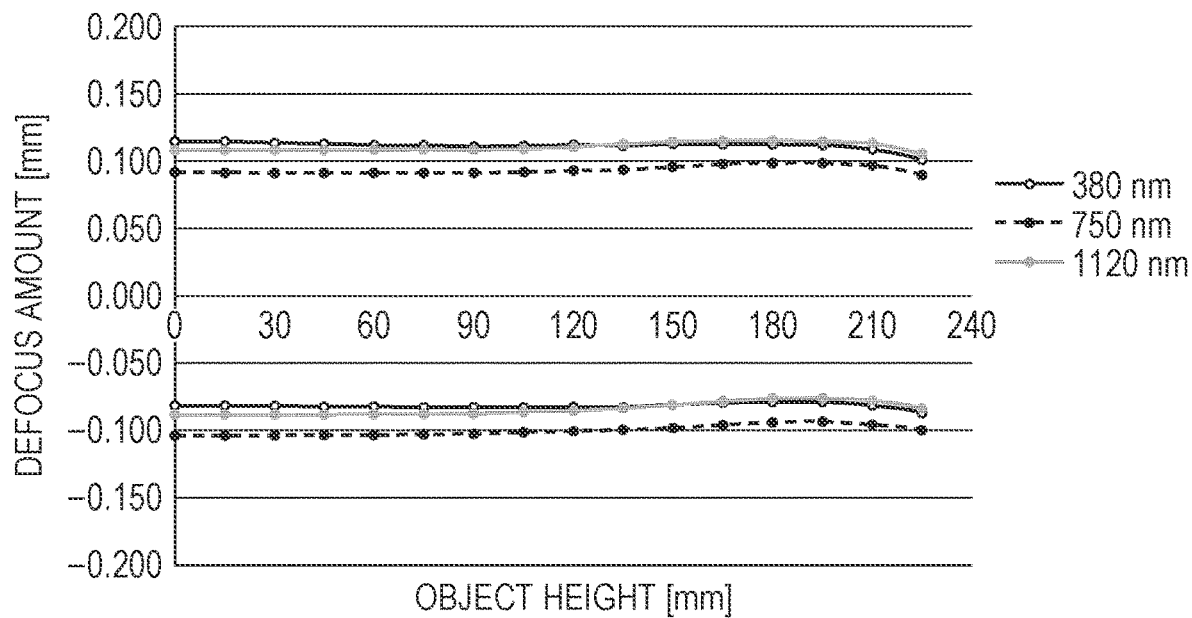
FIG. 9A is a view illustrating a depth curve in the XY section of an optical system according to Comparative Example 1.
Figure 9B:
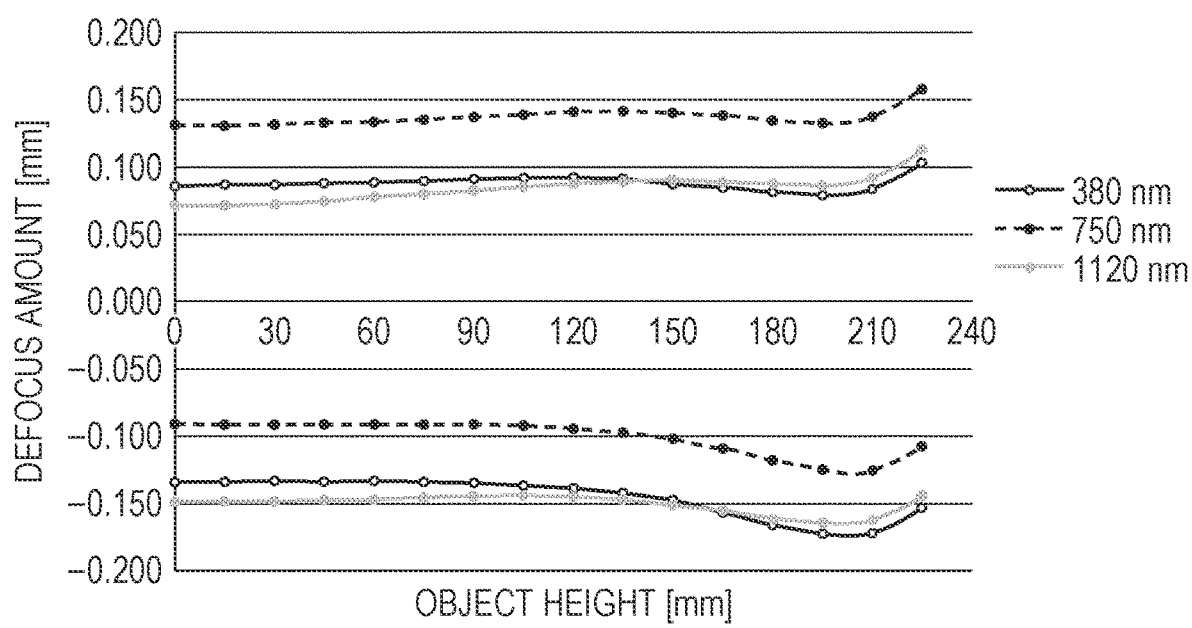
FIG. 9B is a view illustrating a depth curve in the ZX section of an optical system according to Comparative Example 1.

FIG. 7 illustrates a relationship (depth curve) between each object height and a defocus amount [mm] when the MTF for each wavelength of the optical system 10 is sliced at 40%. FIG. 7A illustrates depth curves in the XY section, and FIG. 7B illustrates depth curves in the ZX section. In FIG. 7, the curves on the plus side of the vertical axis indicate upper limits of the depth width, and the curves on the minus side thereof indicate lower limits of the depth width.

Similarly to FIG. 6 and FIG. 7, FIG. 8 and FIG. 9 illustrate the MTF of the optical system according to Comparative Example 1 and depth curves of the optical system. Comparing FIG. 6 and FIG. 7 with FIG. 8 and FIG. 9, it is found that an aberration that differs for each wavelength is favorably corrected in the entire reading region in the present example and that the focal depth is sufficiently ensured. In particular, it is found that differences between the depth curves of the wavelengths are reduced in FIG. 7B relating to the present example while the depth curves of the wavelengths are largely separated from each other in FIG. 9B relating to Comparative Example 1.

Example 2

Hereinafter, the optical system 10 according to Example 2 of the present invention will be described. Regarding the optical system 10 according to the present example, description of configurations equivalent to those of the optical system 10 according to Example 1 described above is omitted.

In the present example, the distance from the subject to the diaphragm 1 is 300 mm, the width of the reading region in the first direction is 300 mm, and the angle of view in the XY section is ±24.17°. In the present example, the use wavelength band is 400 nm to 1000 nm, and the width of the image formation region on the light reception surface 7 in the second direction is 2.7 mm.

As with Example 1, Table 5 indicates the position of the vertex of each optical surface of the optical system 10 according to the present example, the direction of the normal line at the vertex, and the radius of curvature in each section, Table 6 indicates the surface shape of each optical surface, and Table 7 indicates the diameters of the opening of the diaphragm 1, the opening of the light shielding member 4, and the light reception surface 7.

TABLE 5

|  |  | X | Y | Z | θ | d | d' | $R_y$ | $R_z$ |
| --- | --- | --- | --- | --- | --- | --- | --- | --- | --- |
| Diaphragm | 1 | 0.000 | 0.000 | −1.700 | 0.00 | 15.458 | 15.473 |  |  |
| First Reflection Surface | 2 | 15.458 | 0.000 | −1.751 | −157.83 | 9.802 | 9.797 | −309.32 | 287.2587 |
| Second Reflection Surface | 3 | 8.530 | 0.000 | 8.684 | 66.71 | 18.589 | 18.578 | −38.6807 | 43.27758 |
| Light Shielding Member | 4 | 8.924 | 0.000 | 9.900 | 90.00 | 49.797 | 49.794 |  |  |
| Third Reflection Surface | 5 | 10.058 | 0.000 | 59.684 | −107.49 | 20.134 | 20.144 | 65.49315 | 57.16741 |
| Fourth Reflection Surface | 6 | 0.335 | 0.000 | 42.054 | 30.40 | 25.247 | 25.239 | 160.8051 | 153.3273 |
| Cover Glass | G2 | 25.582 | 0.000 | 41.900 | 0.00 | 0.600 | 0.600 |  |  |
| Light Reception Surface | 7 | 26.182 | 0.000 | 41.900 | 0.00 |  |  |  |  |

TABLE 6

| | First Reflection Surface | Second Reflection Surface | Third Reflection Surface | Fourth Reflection Surface |
|---|---|---|---|---|
| $R_y$ | −3.093E+02 | −3.868E+01 | 6.549E+01 | 1.608E+02 |
| $K_y$ | −1.000E+00 | −1.000E+00 | −1.000E+00 | 1.000E+00 |
| $B_2$ | 0.000E+00 | 0.000E+00 | 0.000E+00 | 0.000E+00 |
| $B_4$ | 8.067E−06 | −1.590E−05 | 5.870E−07 | −8.664E−07 |
| $B_6$ | −5.811E−11 | −3.260E−07 | −1910E−11 | 4.766E−10 |
| r | 0.000E+00 | 0.000E+00 | 0.000E+00 | 0.000E+00 |
| $K_z$ | 0.000E+00 | 0.000E+00 | 0.000E+00 | 0.000E+00 |
| $E_2$ | 0.000E+00 | 0.000E+00 | 0.000E+00 | 0.000E+00 |
| $E_4$ | 0.000E+00 | 0.000E+00 | 0.000E+00 | 0.000E+00 |
| $M_{01}$ | 0.000E+00 | 0.000E+00 | 0.000E+00 | 0.000E+00 |
| $M_{21}$ | 1.398E−04 | 2.471E−04 | −1.616E−05 | −7.503E−05 |
| $M_{41}$ | 6.002E−07 | 2.947E−06 | −1.078E−08 | 9.053E−09 |
| $M_{02}$ | 1.741E−03 | 1.155E−02 | 8.746E−03 | 3.261E−03 |
| $M_{22}$ | 2.824E−05 | −5.717E−05 | 1.133E−06 | 1.158E−06 |
| $M_{42}$ | −1.558E−08 | 3.920E−08 | −3.499E−10 | 3.836E−09 |
| $M_{03}$ | −1.283E−05 | 1.259E−04 | 4.677E−06 | −3.030E−05 |
| $M_{23}$ | 1.542E−06 | 1.055E−05 | 0.000E+00 | −1.152E−08 |
| $M_{43}$ | −1.167E−08 | 1.254E−07 | 0.000E+00 | −2.431E−10 |
| $M_{04}$ | 1.214E−04 | −1.906E−04 | 1.455E−06 | −1.327E−06 |
| $M_{24}$ | 1.459E−07 | −2.301E−06 | 0.000E+00 | −2.510E−09 |
| $M_{44}$ | 0.000E+00 | 0.000E+00 | 0.000E+00 | 0.000E+00 |
| $M_{05}$ | 0.000E+00 | 0.000E+00 | 0.000E+00 | 0.000E+00 |
| $M_{25}$ | 0.000E+00 | 0.000E+00 | 0.000E+00 | 0.000E+00 |
| $M_{45}$ | 0.000E+00 | 0.000E+00 | 0.000E+00 | 0.000E+00 |
| $M_{06}$ | 0.000E+00 | 0.000E+00 | 0.000E+00 | 0.000E+00 |
| $M_{26}$ | 0.000E+00 | 0.000E+00 | 0.000E+00 | 0.000E+00 |
| $M_{46}$ | 0.000E+00 | 0.000E+00 | 0.000E+00 | 0.000E+00 |
| C1 | | | 6.330E−02 | |
| C2 | | | 9.0157E−06 | |
| C3 | | | −1.3134E−05 | |
| λ | | | 0.542 | |

TABLE 7

| | Diaphragm | Light Shielding Member | Light Reception Surface |
|---|---|---|---|
| Diameter (y) | 35.2 | 3.6 | 7.2 |
| Diameter (z) | 3.6 | 0.05 | 5.4 |

Next, an optical system according to Comparative Example 2 will be considered to describe the optical performance of the present example. Regarding the optical system according to Comparative Example 2, values indicated in Table 5 and Table 7 are the same as those of Example 2, but values of the aspheric coefficient and the phase coefficient of the diffraction surface 5 and the fourth reflection surface 6 differ from those of Example 2. Similarly to Table 6, Table 8 indicates surface shapes of the optical surfaces of the optical system according to Comparative Example 2.

TABLE 8

| | First Reflection Surface | Second Reflection Surface | Third Reflection Surface | Fourth Reflection Surface |
|---|---|---|---|---|
| $R_y$ | −3.093E+02 | −3.868E+01 | 6.554E+01 | 1.600E+02 |
| $K_y$ | −1.000E+00 | −1.000E+00 | −1.000E+00 | −1.000E+00 |
| $B_2$ | 0.000E+00 | 0.000E+00 | 0.000E+00 | 0.000E+00 |
| $B_4$ | 8.067E−06 | −1.590E−05 | 5.840E−07 | −8.601E−07 |
| $B_6$ | −5.811E−11 | −3.260E−07 | −1.134E−11 | 4.309E−10 |
| r | 0.000E+00 | 0.000E+00 | 0.000E+00 | 0.000E+00 |
| $K_z$ | 0.000E+00 | 0.000E+00 | 0.000E+00 | 0.000E+00 |
| $E_2$ | 0.000E+00 | 0.000E+00 | 0.000E+00 | 0.000E+00 |
| $E_4$ | 0.000E+00 | 0.000E+00 | 0.000E+00 | 0.000E+00 |
| $M_{01}$ | 0.000E+00 | 0.000E+00 | 0.000E+00 | 0.000E+00 |
| $M_{21}$ | 1.398E−04 | 2.471E−04 | −1.632E−05 | −7.584E−05 |
| $M_{41}$ | 6.002E−07 | 2.947E−06 | −1.121E−08 | 7.866E−09 |
| $M_{02}$ | 1.741E−03 | 1.155E−02 | 8.752E−03 | 3.234E−03 |
| $M_{22}$ | 2.824E−05 | −5.717E−05 | 1.120E−06 | 1.186E−06 |

TABLE 8-continued

| | First Reflection Surface | Second Reflection Surface | Third Reflection Surface | Fourth Reflection Surface |
|---|---|---|---|---|
| $M_{42}$ | −1.558E−08 | 3.920E−08 | −3.108E−10 | 3.801E−09 |
| $M_{03}$ | −1.283E−05 | 1.259E−04 | 1.370E−05 | −3.088E−05 |
| $M_{23}$ | 1.542E−06 | 1.055E−05 | 0.000E+00 | −1.564E−08 |
| $M_{43}$ | −1.167E−08 | 1.254E−07 | 0.000E+00 | −1.896E−10 |
| $M_{04}$ | 1.214E−04 | −1.906E−04 | 6.180E−07 | 1.353E−06 |
| $M_{24}$ | 1.459E−07 | −2.301E−06 | 0.000E+00 | 5.803E−10 |
| $M_{44}$ | 0.000E+00 | 0.000E+00 | 0.000E+00 | 0.000E+00 |
| $M_{05}$ | 0.000E+00 | 0.000E+00 | 0.000E+00 | 0.000E+00 |
| $M_{25}$ | 0.000E+00 | 0.000E+00 | 0.000E+00 | 0.000E+00 |
| $M_{45}$ | 0.000E+00 | 0.000E+00 | 0.000E+00 | 0.000E+00 |
| $M_{06}$ | 0.000E+00 | 0.000E+00 | 0.000E+00 | 0.000E+00 |
| $M_{26}$ | 0.000E+00 | 0.000E+00 | 0.000E+00 | 0.000E+00 |
| $M_{46}$ | 0.000E+00 | 0.000E+00 | 0.000E+00 | 0.000E+00 |
| C1 | | | 6.331E−02 | |
| C2 | | | 0.000E+00 | |
| C3 | | | 0.000E+00 | |
| λ | | | 0.542 | |

In the present example, as the above-described first step, the value of the fourth-order aspheric coefficient $M_{04}$ of the fourth reflection surface 6 in the ZX section is $-1.327 \times 10^{-6}$ in contrast to $1.353 \times 10^{-6}$ in Comparative Example 2. Consequently, the fourth reflection surface 6 has a protruding shape at the peripheral portion, and a shift of the light convergence position in the optical axis direction for each wavelength is corrected.

Figure 10:
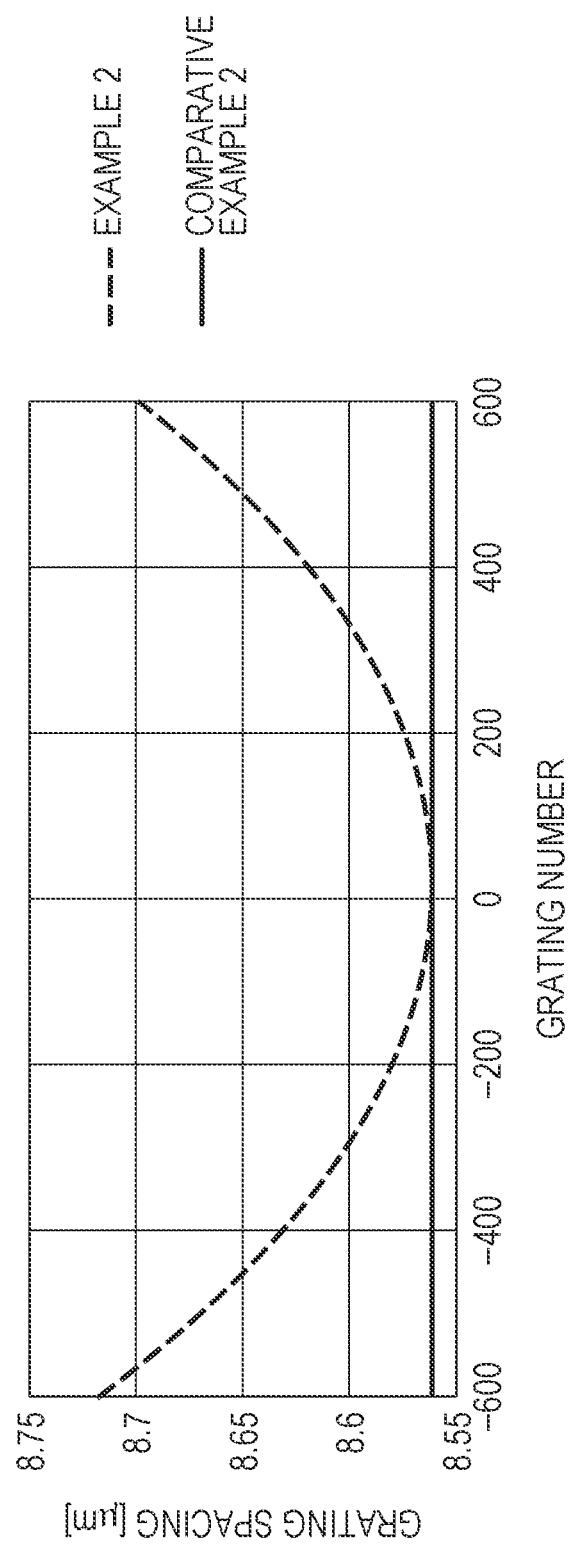
FIG. 10 is a view illustrating changes in grating spacing of diffraction surfaces according to Example 2 and Comparative Example 2.

In the present example, as the above-described second step, the value of the third-order phase coefficient C3 in the phase function φ is $-1.3134 \times 10^{-5}$ in contrast to 0 in Comparative Example 2. Consequently, the grating spacing of the diffraction surface 5 increases by approximately 2.8% from 8.562 μm on the optical axis to 8.804 μm at the peripheral portion (z=6.8 mm), and coma aberrations of wavelengths are controlled to be substantially equal to each other. Similarly to FIG. 5, FIG. 10 indicates states of changes in the grating spacing of the diffraction surface 5 in the present example and Comparative Example 2.

In the present example, as the above-described third step, the value of the third-order aspheric coefficient $M_{03}$ of the diffraction surface 5 in the ZX section is $4.677 \times 10^{-6}$ in contrast to $1.370 \times 10^{-5}$ in Comparative Example 2. Consequently, the side of the diffraction surface 5 close to the light reception surface 7 has a protruding shape having larger negative power, the side thereof far from the light reception surface 7 has a recessed shape having larger positive power, and the coma aberration of each wavelength is thereby favorably corrected.

In the present example, the value of the second-order aspheric coefficient $M_{02}$ of the diffraction surface 5 in the ZX section is $8.746E \times 10^{-3}$ in contrast to $8.752E \times 10^{-3}$ in Comparative Example 2. Consequently, the shape of the diffraction surface 5 in the ZX section is curved as a whole, the light convergence position of each light flux is moved toward the under side, and a shift with respect to the light reception surface 7 is corrected.

Figure 11:
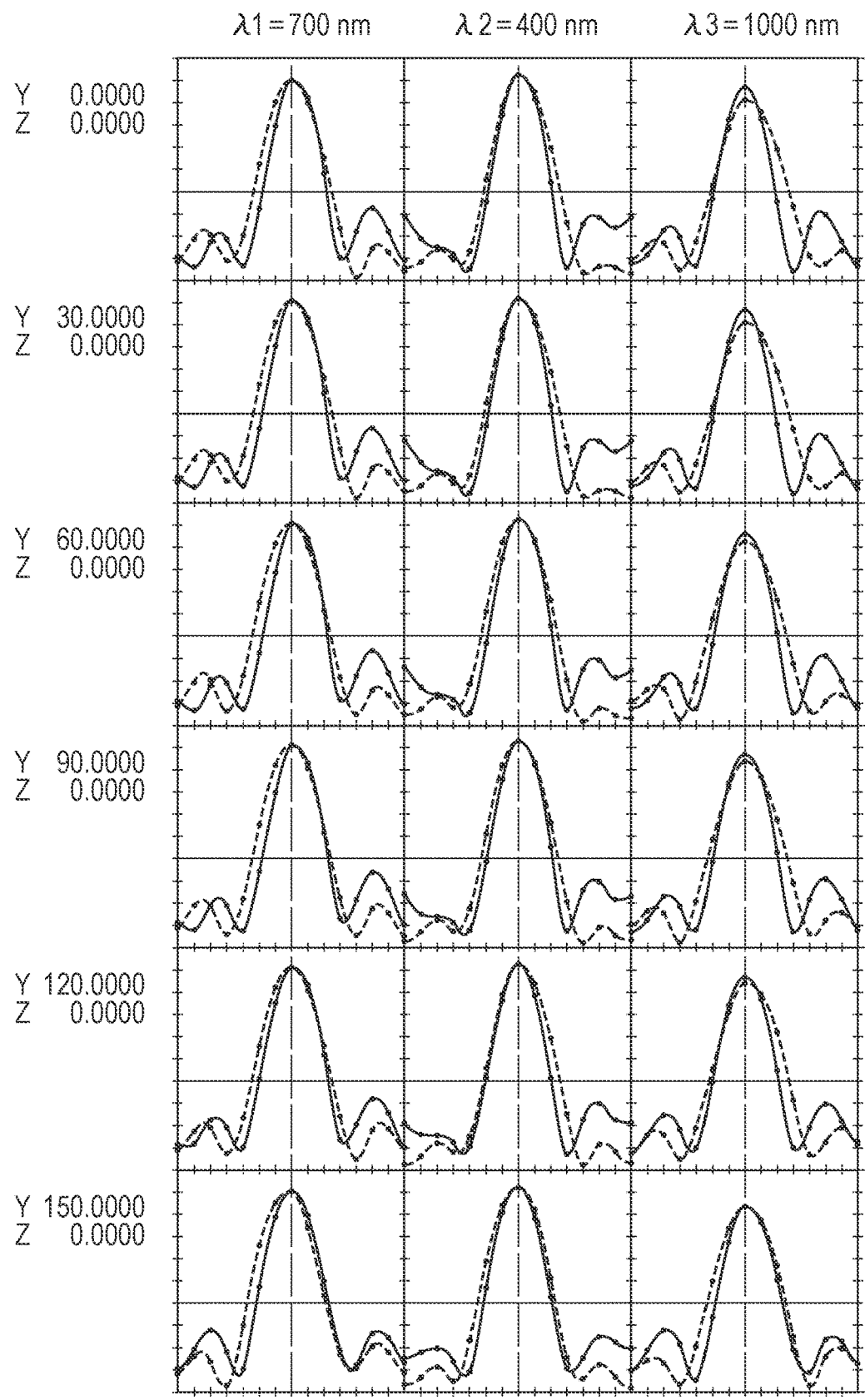
FIG. 11 is a view illustrating a MTF of an optical system according to Example 2.
Figure 12A:
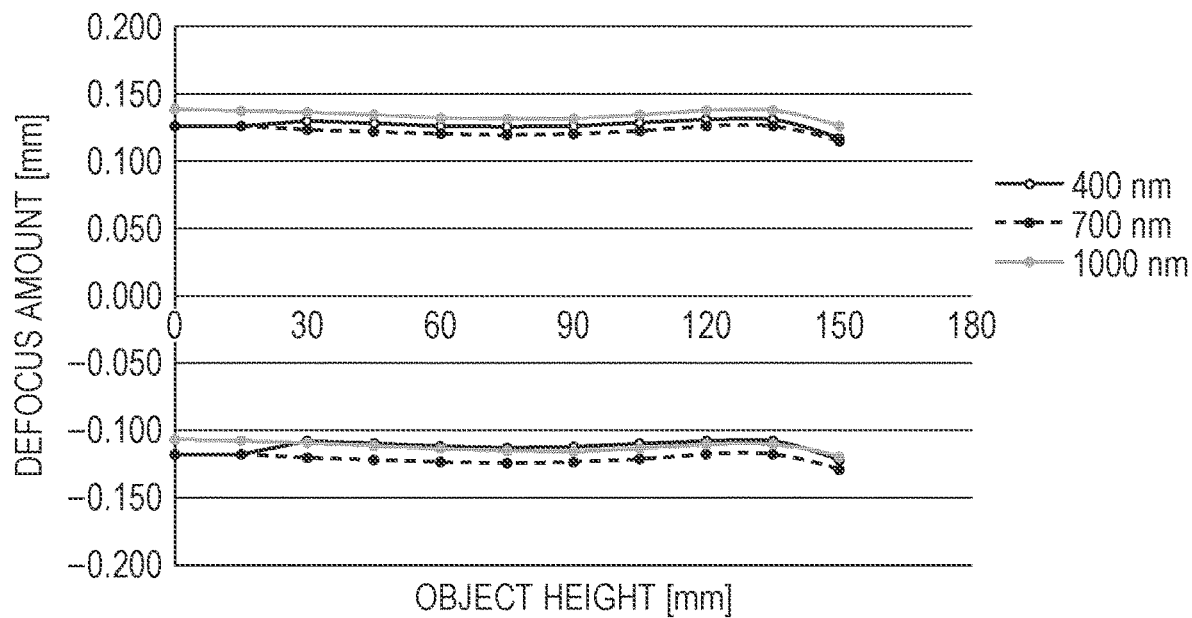
FIG. 12A is a view illustrating a depth curve in the XY section of an optical system according to Example 2.
Figure 12B:
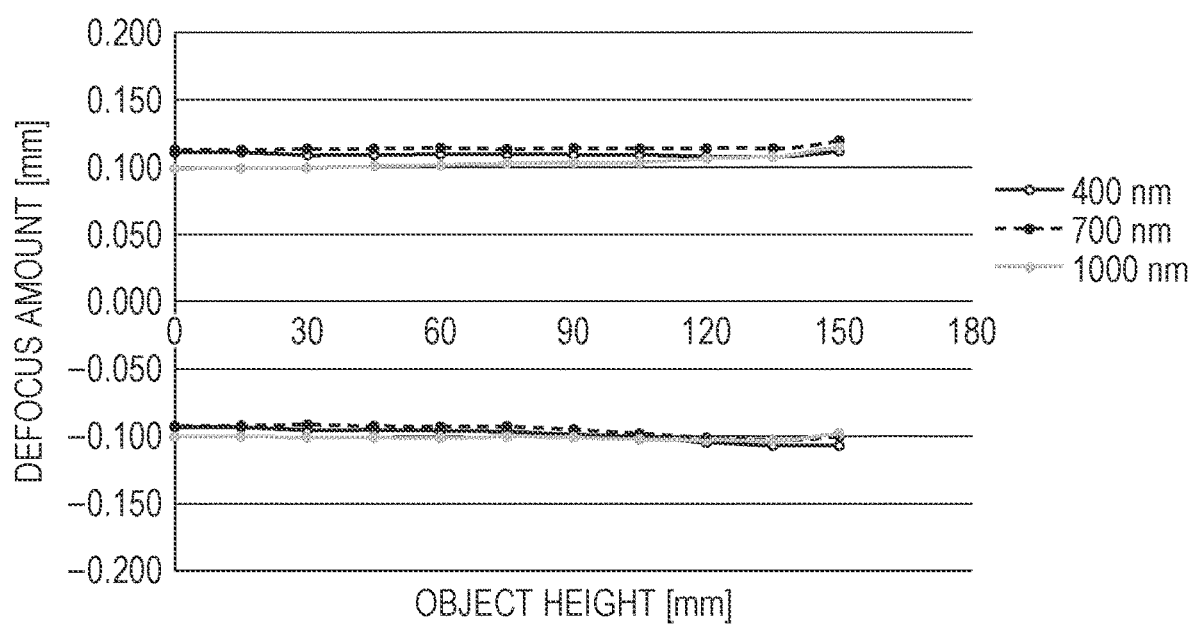
FIG. 12B is a view illustrating a depth curve in the ZX section of an optical system according to Example 2.
Figure 13:
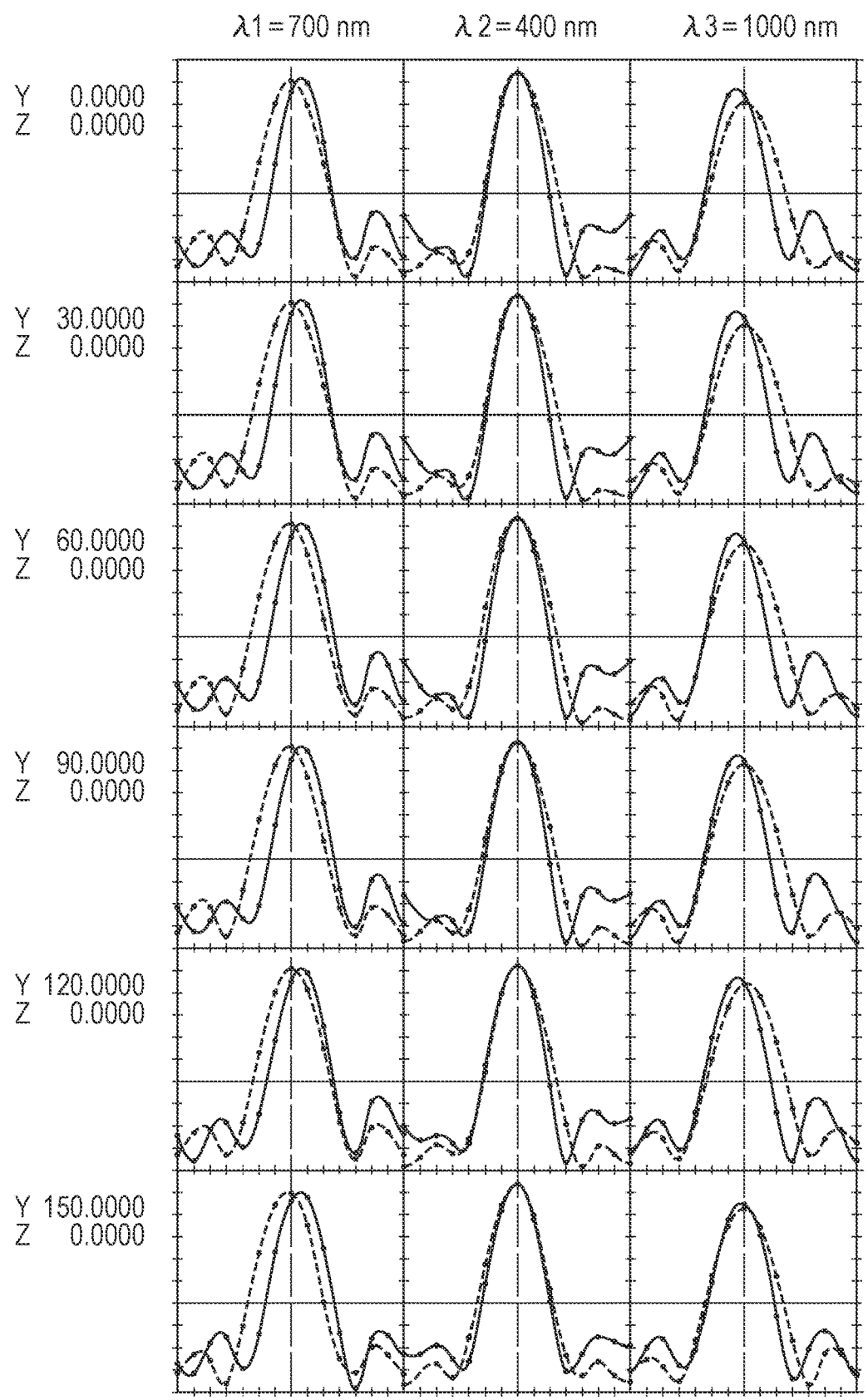
FIG. 13 is a view illustrating a MTF of an optical system according to Comparative Example 2.
Figure 14A:
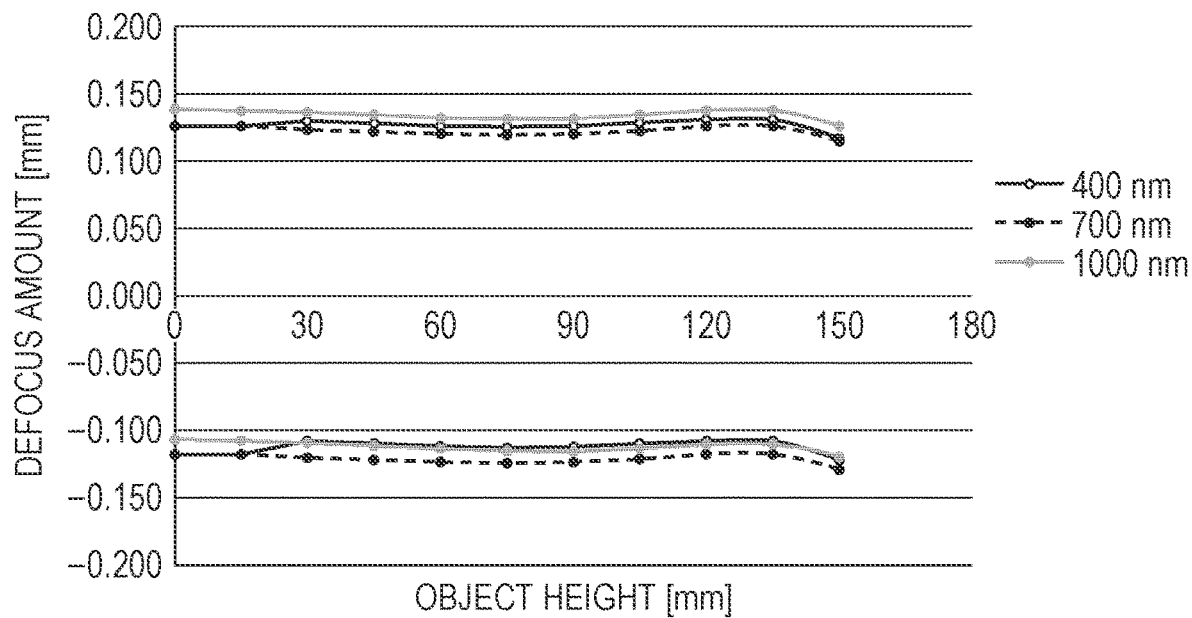
FIG. 14A is a view illustrating a depth curve in the XY section of an optical system according to Comparative Example 2.
Figure 14B:
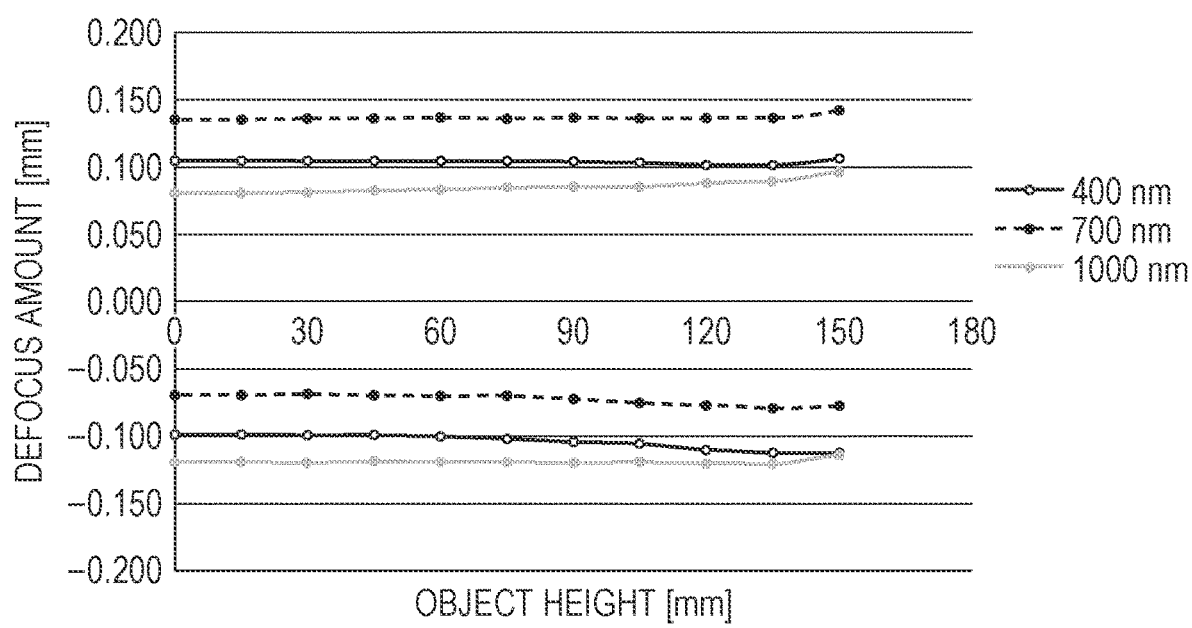
FIG. 14B is a view illustrating a depth curve in the ZX section of an optical system according to Comparative Example 2.

Similarly to FIG. 6 and FIG. 7, FIG. 11 and FIG. 12 illustrate the MTF of the optical system according to the present example and the depth curve of the optical system. FIG. 11 illustrates the MTF for each of wavelengths λ1=700 nm, λ2=400 nm, and λ3=1000 nm in each of cases in which the object height [mm] in the reading region is Y=0, 30, 60, 90, 120, and 150. The spatial frequency [number/mm] of the imaging element including the light reception surface 7 is 27.8/mm.

Similarly to FIG. 11 and FIG. 12, FIG. 13 and FIG. 14 illustrate the MTF of the optical system according to Comparative Example 2 and the depth curve of the optical system. Comparing FIG. 11 and FIG. 12 with FIG. 13 and FIG. 14, it is found that an aberration that differs for each wavelength is favorably corrected in the entire reading region in the present example and that the focal depth is sufficiently ensured. In particular, it is found that differences between the depth curves of the wavelengths are reduced in FIG. 12B relating to the present example while the depth curves of the wavelengths are largely separated from each other in FIG. 14B relating to Comparative Example 2.

Imaging Apparatus and Imaging System

Hereinafter, an imaging apparatus (spectral reading apparatus) and an imaging system (spectral reading system) as a usage example of the optical system 10 according to the above-described embodiment will be described.

Figure 15:
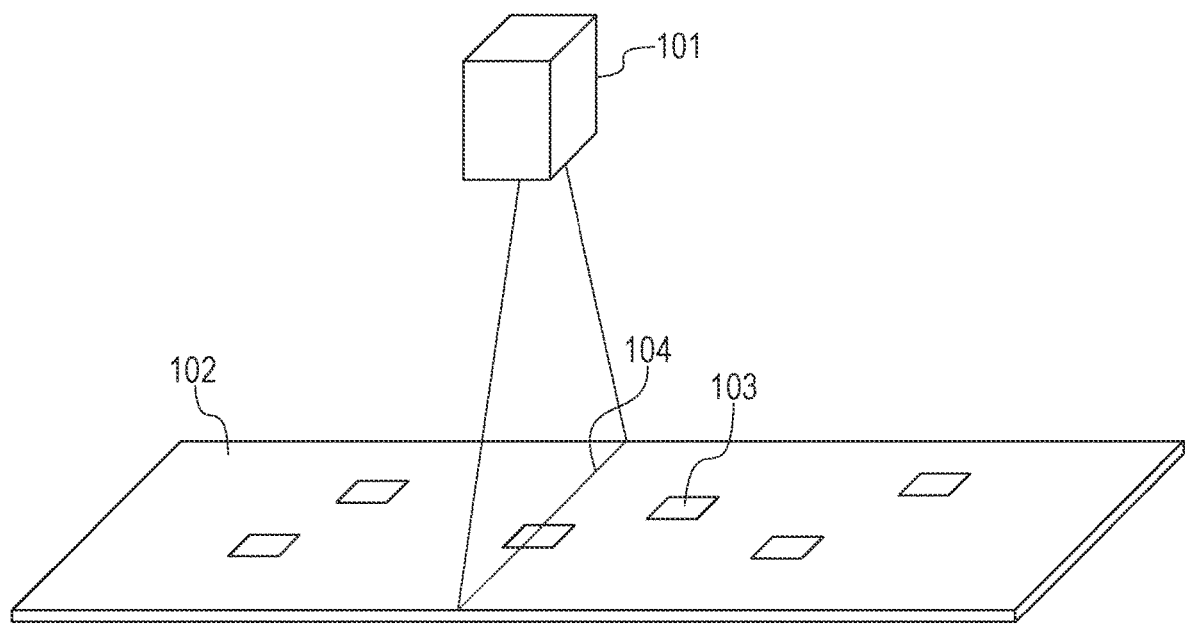
FIG. 15 is a schematic view of a principal portion of an imaging system as Usage Example 1 of an optical system according to an embodiment.
Figure 16:
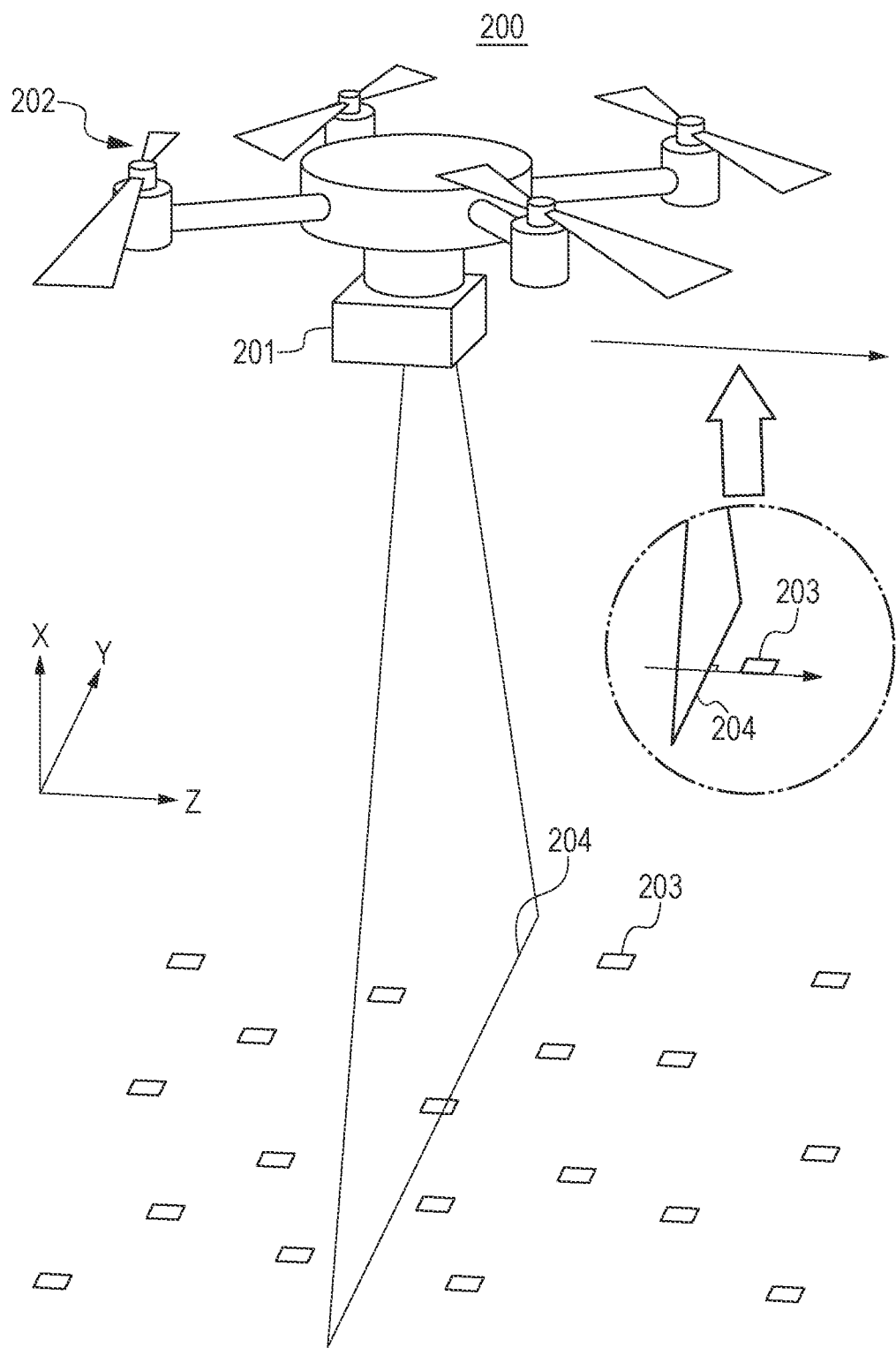
FIG. 16 is a schematic view of a principal portion of an imaging system as Usage Example 2 of an optical system according to an embodiment.

FIG. 15 and FIG. 16 are schematic views of principal portions of imaging systems 100 and 200 according to an embodiment of the present invention. The imaging systems 100 and 200 respectively include imaging apparatuses 101 and 201 each including the optical system 10 and an imaging element that receives light of an image formed by the optical system 10, and conveyers 102 and 202 that each change a relative position between the respective imaging apparatus and a subject 103 or 203. Each imaging system preferably includes an image processing unit that generates an image on the basis of image information obtained from the imaging element. The image processing unit is, for example, a processor such as a CPU and may be provided either of inside and outside of the respective imaging apparatus.

The imaging apparatuses 101 and 201 are capable of obtaining a plurality of pieces of image information (one-dimensional images) corresponding to a plurality of wavelengths by respectively imaging linear reading regions 104 and 204 elongated in the first direction (Y-direction) once. Each of the imaging apparatuses is desirably configured as a multi-spectrum camera capable of obtaining image information corresponding to wavelengths of four or more types, which are larger than that in a general camera. Further, each of the imaging apparatuses is more preferably configured as a hyperspectral camera capable of obtaining image information corresponding to wavelengths of 100 or more types.

As the imaging element in each of the imaging apparatuses, a CCD (Charge Coupled Device) sensor, a CMOS (Complementary Metal Oxide Semiconductor) sensor, or the like can be employed. The imaging element may be configured to be able to photoelectrically converting not only visible light but also infrared light (near-infrared light or far-infrared light) and the like. Specifically, an imaging element in which a material such as InGaAs or InAsSb is used may be employed in accordance with the use wavelength band. The pixel number of the imaging element is desirably determined on the basis of resolution obtained in the reading direction and the spectral direction.

As illustrated in FIG. 15, the conveyer 102 in the imaging system 100 is a means that moves the subject 103 in the second direction (Z-direction). A belt conveyer or the like can be employed as the conveyer 102. As illustrated in FIG. 16, the conveyer 202 in the imaging system 200 is a means that moves the imaging apparatus 201 in the second direction. A multicopter, an airplane, a satellite, or the like can be employed as the conveyer 202. The use of the conveyer 202 enables even a large subject that is not possible to be conveyed by a belt conveyer or the like, a subject that is not easily moved, and the like to be imaged at a plurality of positions in the second direction.

The imaging systems 100 and 200 are capable of obtaining a plurality of pieces of image information corresponding to a plurality of positions in the second direction by causing the respective imaging apparatuses to sequentially image the reading region while causing the respective conveyers to change a relative position between the respective imaging apparatuses and the respective subjects. It is possible to generate a two-dimensional image corresponding to a specific wavelength by performing rearrangement of the plurality of imaged images and arithmetic processing by the image processing unit. Since each piece of image information indicates gradation information in the first direction, the image processing unit may generate spectrum distribution (spectrum information) on the basis of gradation information for each wavelength at a specific position in the second direction.

Each conveyer may be configured to move both of the respective imaging apparatuses and the respective subjects. The conveyers may be able to adjust a relative position between the respective imaging apparatuses and the respective subjects in the optical axis direction (X-direction). Alternatively, a drivable optical member (focus member) may be disposed inside or outside the optical system 10 to enable focusing with respect to the subject by adjusting the position of the optical member.

Inspection Method and Manufacturing Method

Hereinafter, a method of inspecting an object (subject) and a method of manufacturing an article by using the optical system 10 according to the above-described embodiment will be described. The optical system 10 is suitable for inspection (evaluation) in, for example, industrial fields including manufacturing industry, agricultural industry, medical industry, and the like.

In the first step (imaging step) in an inspection method according to the present embodiment, an object is imaged through the optical system 10 to thereby obtain image information of the object. At this time, an imaging apparatus and an imaging system such as those described above are usable. That is, it is possible to obtain image information of the entirety of an object by imaging the object while changing the relative position between the object and the imaging apparatus. It is also possible to obtain image information of a plurality of objects sequentially (successively). In the first step, a plurality of pieces of image information corresponding to each of wavelengths of a plurality of light fluxes emitted from the optical system 10 may be obtained.

In the second step (inspection step), the object is inspected on the basis of the image information obtained in the first step. At this time, for example, a user (inspector) may confirm (determine) the presence/absence of a foreign matter, a scratch, and the like in the image information, or a controller (image processing unit) may detect a foreign matter or a scratch in the image information and notify the user of the foreign matter or the scratch. Alternatively, a controller that controls an article manufacturing apparatus, which will be described later, in accordance with a result of determination of the presence/absence of a foreign matter and a scratch may be employed.

In the second step, an object may be inspected on the basis of spectrum distribution of the object obtained by using a plurality of pieces of image information for each wavelength. By using the image information obtained via the optical system 10, it is possible to detect unique spectrum information of the object to be inspected. Consequently, it is possible to specify components of the object. For example, the image processing unit may generate image information on which emphasis such as coloring is performed for each spectrum distribution, and a user may perform inspection on the basis of the image information.

The inspection method according to the present embodiment is applicable to a method of manufacturing an article such as a food product, a medical product, a cosmetic product, and the like. Specifically, a material (object) for manufacturing an article is inspected by the above-described inspection method, and the article can be manufactured by using the inspected material. For example, when presence of a foreign matter or a scratch is determined in the above-described second step, a user (manufacturer) or a manufacturing apparatus can remove the foreign matter from the material or discard the material including the foreign matter or the scratch.

The aforementioned inspection method may be used to detect abnormality of a manufacturing apparatus. For example, presence/absence of abnormality may be determined on the basis of image information of a manufacturing apparatus, and, in accordance with a result of the determination, driving of the manufacturing apparatus may be stopped, or abnormality thereof may be corrected.

Modification

Preferable embodiments and examples of the present invention have been described above. The present invention is, however, not limited to these embodiments and examples. Various combinations, modifications, and changes are possible for the present invention within the scope of the gist thereof.

For example, although the light convergence positions 74M and 75M are shifted toward the under side in FIG. 3A, the light convergence positions 74M and 75M may be shifted toward the over side in accordance with the power, the layout, and the like of the optical surfaces constituting the optical system 10. Therefore, in this case, a reflection surface having a recessed shape (having positive power) at the peripheral portion, compared with that on the optical axis, or a refracting element that is thin (has a protruding shape) at the peripheral portion can be employed. Similarly, in accordance with the power, the layout, and the like of the optical surfaces constituting the optical system 10, the grating spacing of the diffraction surface 5 may be changed to be maximum at the center portion and to become narrower toward the peripheral portion, or the shape of the base surface of the diffraction surface 5 may be changed in a direction opposite to that in each example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An optical system comprising a front group, a light shielding member, and a rear group that are disposed in order from a side of an object to a side of an image,
   wherein the light shielding member has an opening elongated in a first direction,
   wherein the rear group has a diffraction surface that disperses a light flux that has passed through the opening into a plurality of light fluxes of mutually different wavelengths in a first section perpendicular to the first direction, and an aspherical surface disposed closer than the diffraction surface to the side of the image,
   wherein the aspherical surface in the first section has a non-circular-arc shape,
   wherein grating spacing of the diffraction surface in the first section changes from a center portion toward a peripheral portion to include an extremum value at the center portion, and
   wherein, in the first section, a shape of at least one of a base surface of the diffraction surface and an optical surface disposed closer than the diffraction surface to the side of the object is asymmetric with respect to a normal line at a vertex thereof.

2. The optical system according to claim 1, wherein a shape of the base surface of the diffraction surface in the first section is asymmetric with respect to a normal line at a vertex thereof.

3. The optical system according to claim 1, wherein the grating spacing of the diffraction surface increases from the center portion toward the peripheral portion.

4. The optical system according to claim 1, wherein the front group forms an intermediate image of the object over the opening in the first section and does not form an image of the object over the opening in a second section parallel to the first direction.

5. The optical system according to claim 1, wherein the diffraction surface is a reflection surface.

6. The optical system according to claim 1, wherein the base surface of the diffraction surface is an anamorphic surface.

7. The optical system according to claim 1, wherein the front group has an anamorphic reflection surface.

8. The optical system according to claim 1, wherein, in a second section parallel to the first direction, the front group has negative power, and the rear group has positive power.

9. The optical system according to claim 1, wherein the light shielding member regulates a width of a light flux from the object in the first direction.

10. The optical system according to claim 1, wherein the front group includes a diaphragm that regulates a width of a light flux from the object in a second direction perpendicular to the first direction.

11. The optical system according to claim 1, wherein all optical surfaces included in the front group and the rear group are reflection surfaces.

12. An imaging apparatus comprising the optical system according to claim 1, and an imaging element that receives light from the optical system.

13. An imaging system comprising the imaging apparatus according to claim 12, and a conveyer that changes a relative position between the imaging apparatus and the object.

14. An inspection method comprising:
   a first step of imaging an object through an optical system and thereby obtaining image information of the object; and
   a second step of inspecting the object based on the image information,
   wherein the optical system includes a front group, a light shielding member, and a rear group that are disposed in order from a side of the object to a side of an image,
   wherein the light shielding member has an opening elongated in a first direction,
   wherein the rear group has a diffraction surface that disperses a light flux that has passed through the opening into a plurality of light fluxes of mutually different wavelengths in a first section perpendicular to the first direction, and an aspherical surface disposed closer than the diffraction surface to the side of the image,
   wherein the aspherical surface in the first section has a non-circular-arc shape, wherein grating spacing of the diffraction surface in the first section changes from a center portion toward a peripheral portion to include an extremum value at the center portion, and wherein, in the first section, a shape of at least one of a base surface of the diffraction surface and an optical surface disposed closer than the diffraction surface to the side of the object is asymmetric with respect to a normal line at a vertex thereof.

15. The inspection method according to claim 14, wherein the first step includes a step of imaging the object while moving the object in a direction perpendicular to the first direction.

16. The inspection method according to claim 14, wherein the first step includes a step of acquiring a plurality of pieces of image information corresponding to respective wavelengths of the plurality of light fluxes.

17. The inspection method according to claim 14, wherein the second step includes a step of inspecting the object based on spectrum distribution of the object acquired using the plurality of pieces of image information.

18. The inspection method according to claim 14, wherein the second step includes a step of determining whether the object includes a foreign material.

19. A manufacturing method comprising:
a step of inspecting the object by the inspection method according to claim 14; and
a step of manufacturing an article by using the object inspected by the step.

20. The manufacturing method according to claim 19, wherein the step of manufacturing the article includes a step of removing a foreign material from the object.

\* \* \* \* \*